INVENTOR
Johann F. Reuteler
De Lio and Montgomery
ATTORNEYS

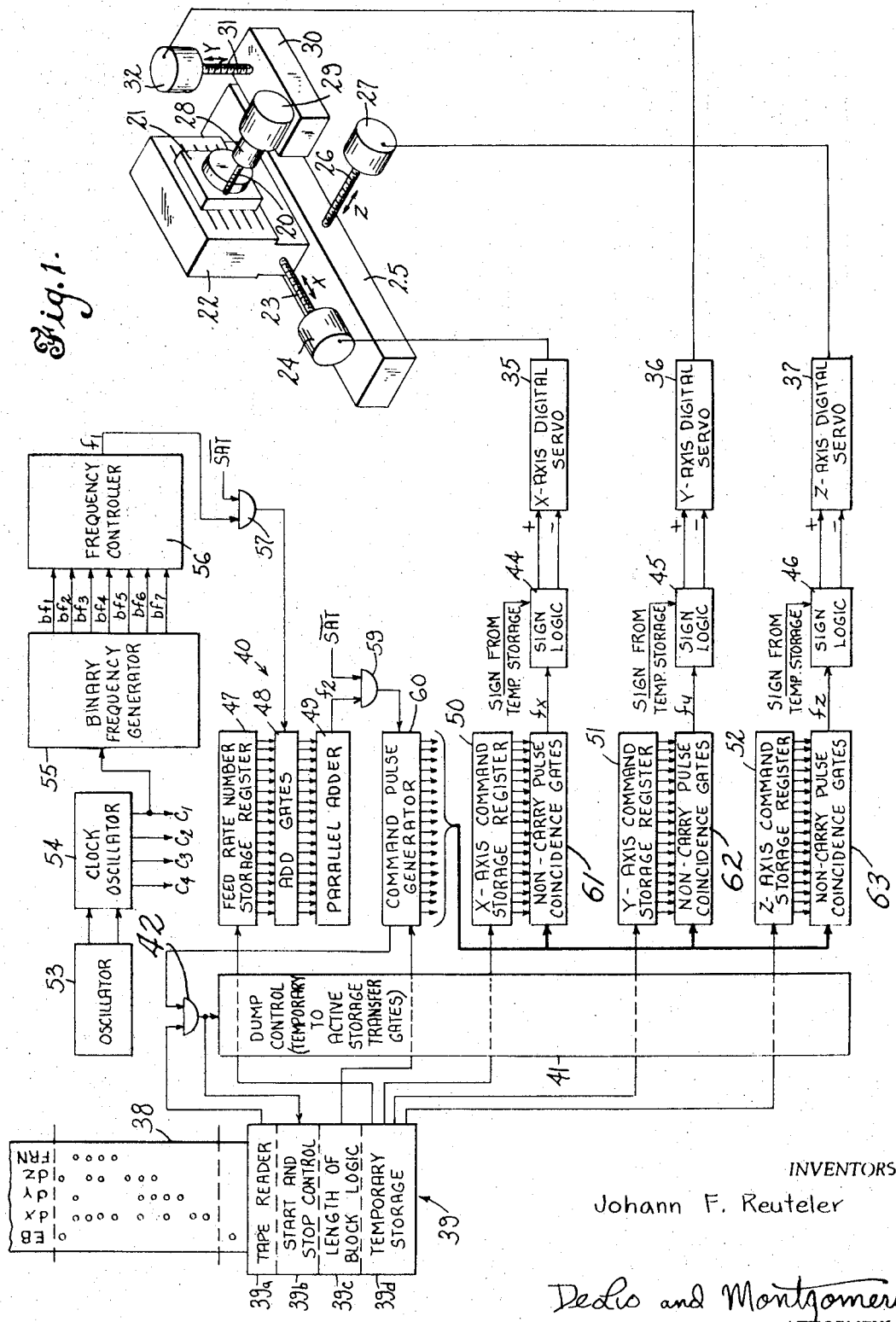

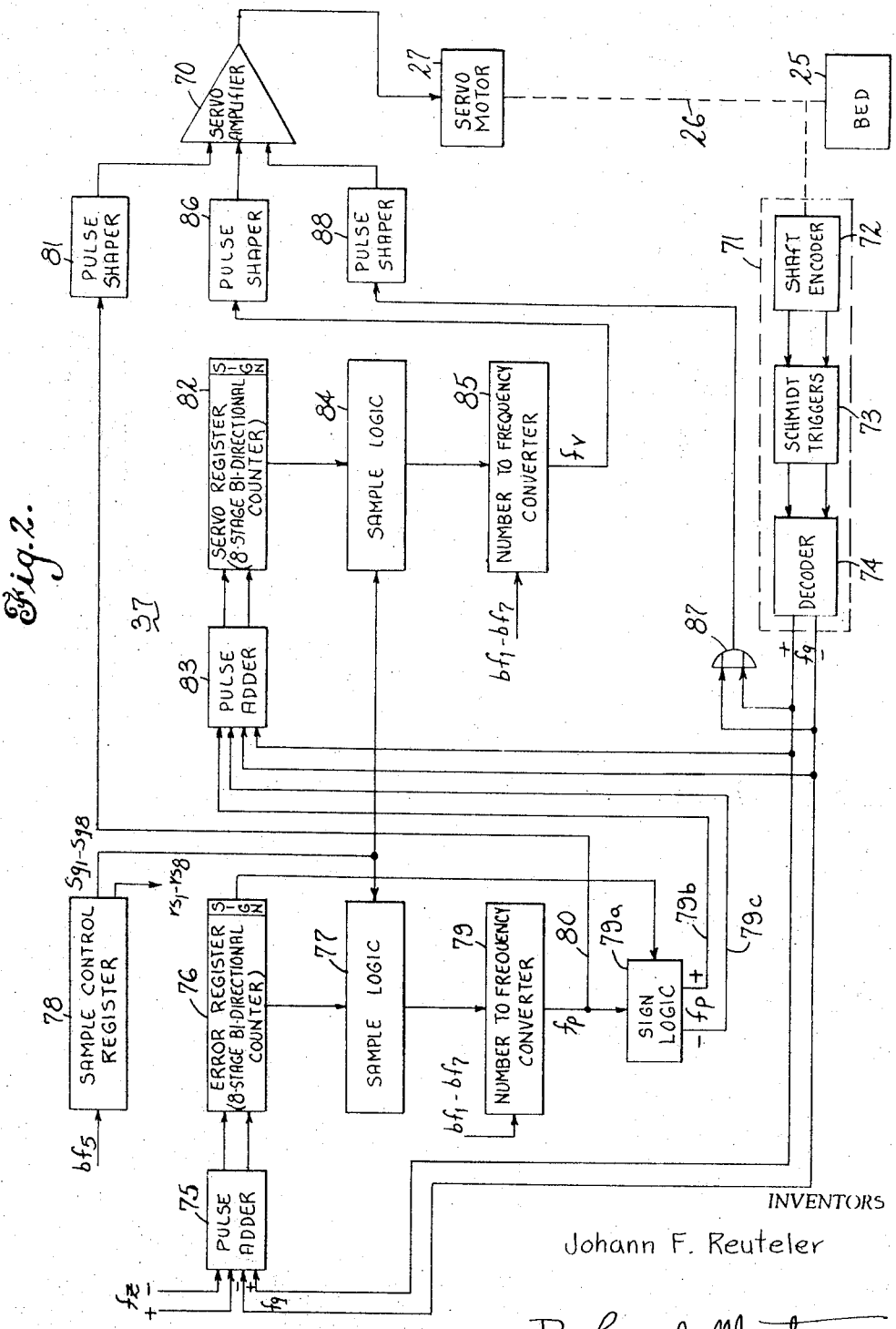

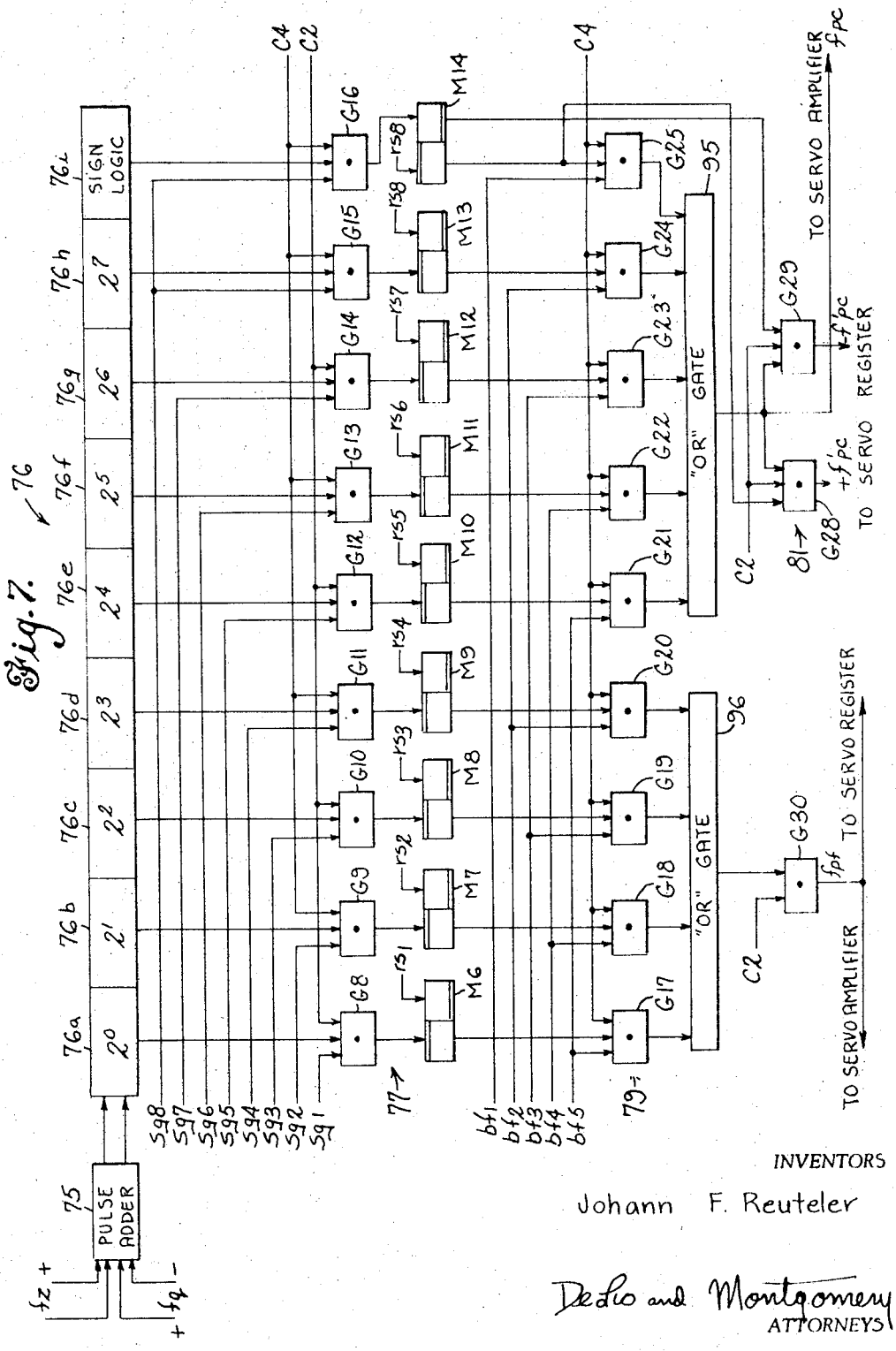

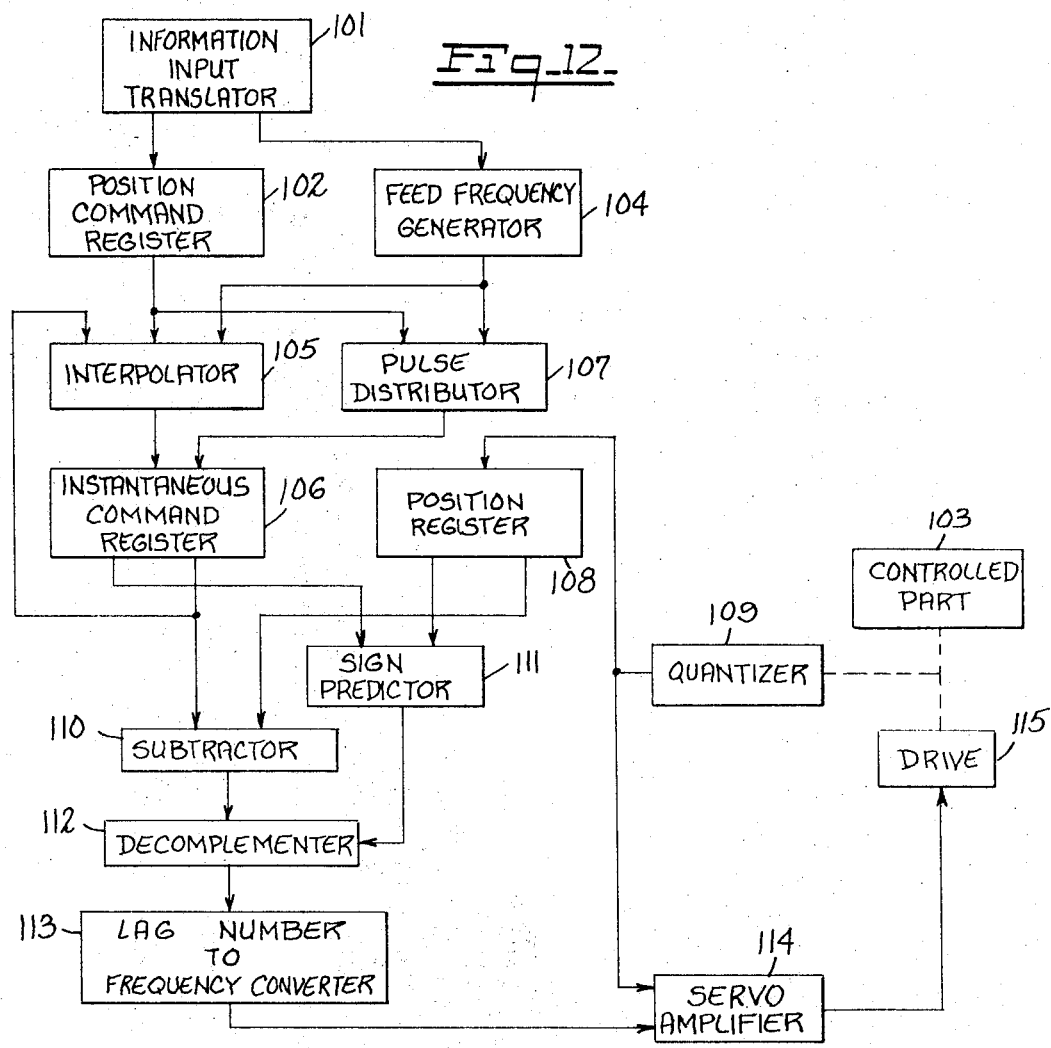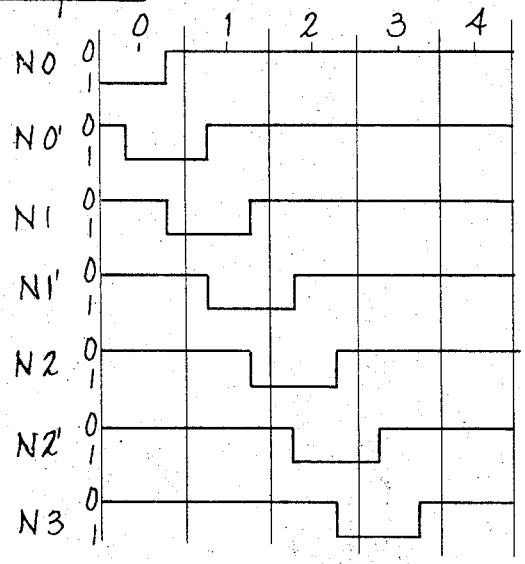

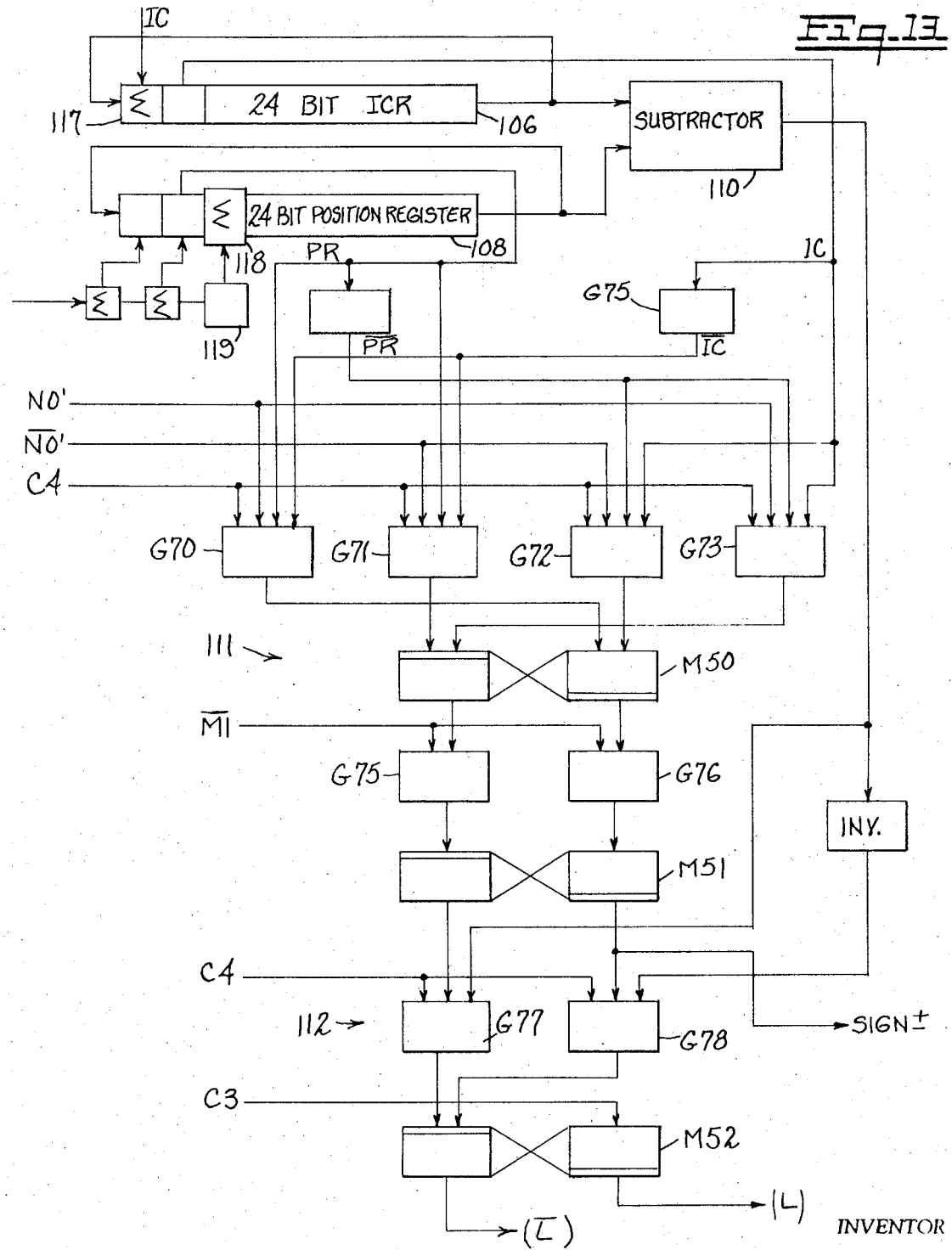

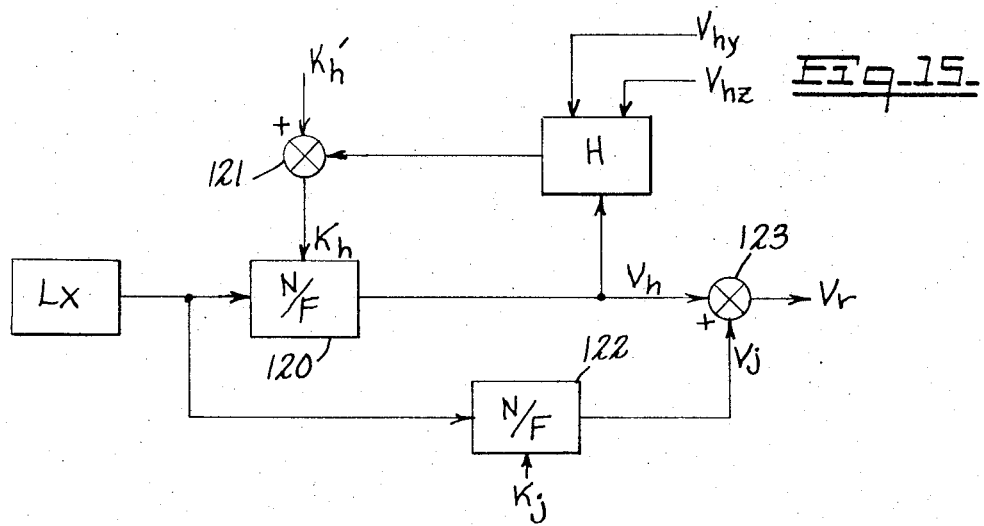
Fig. 15.
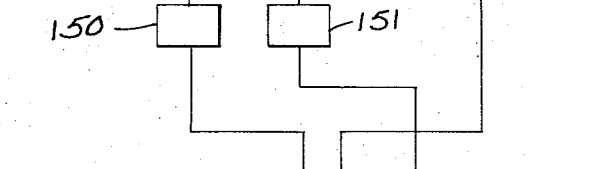
Fig. 20.
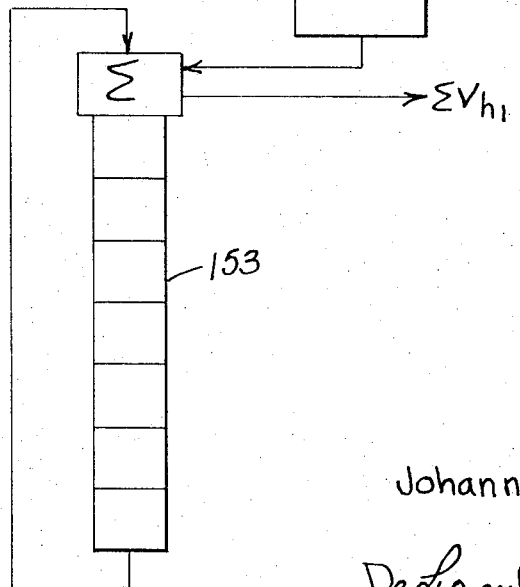

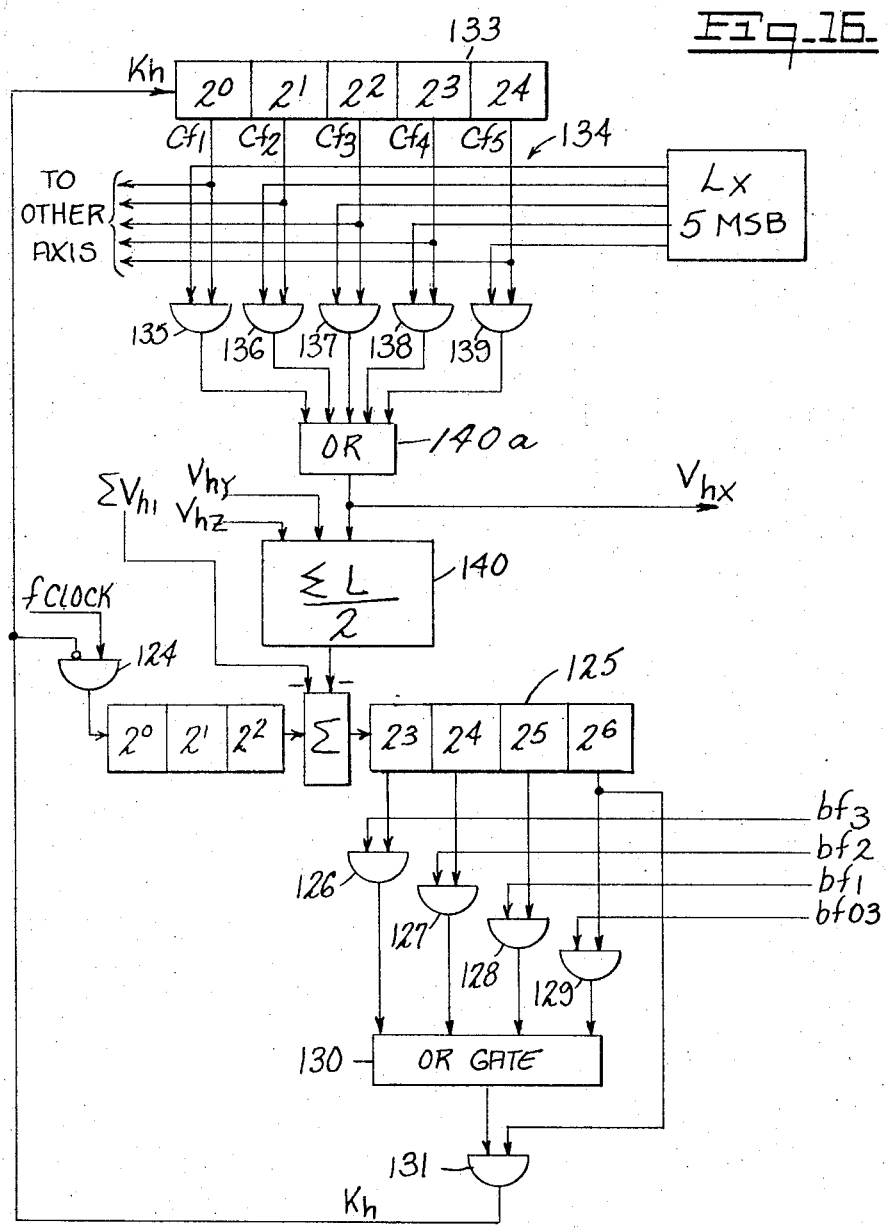

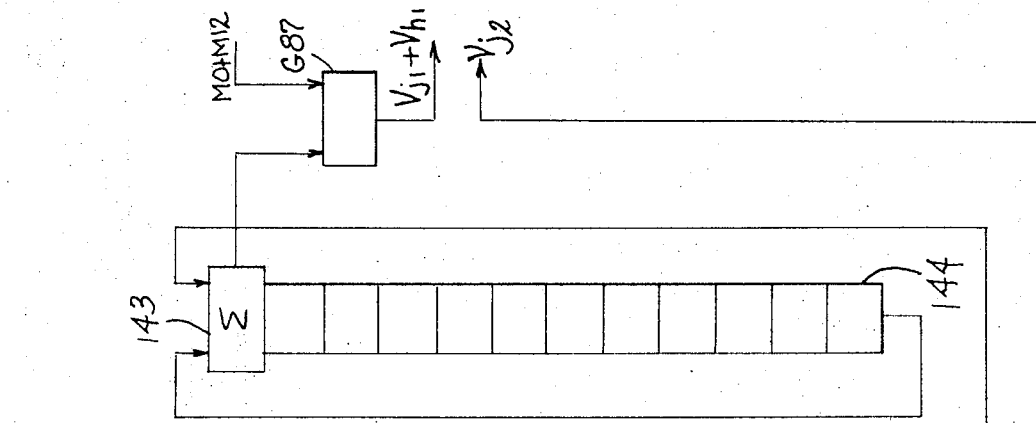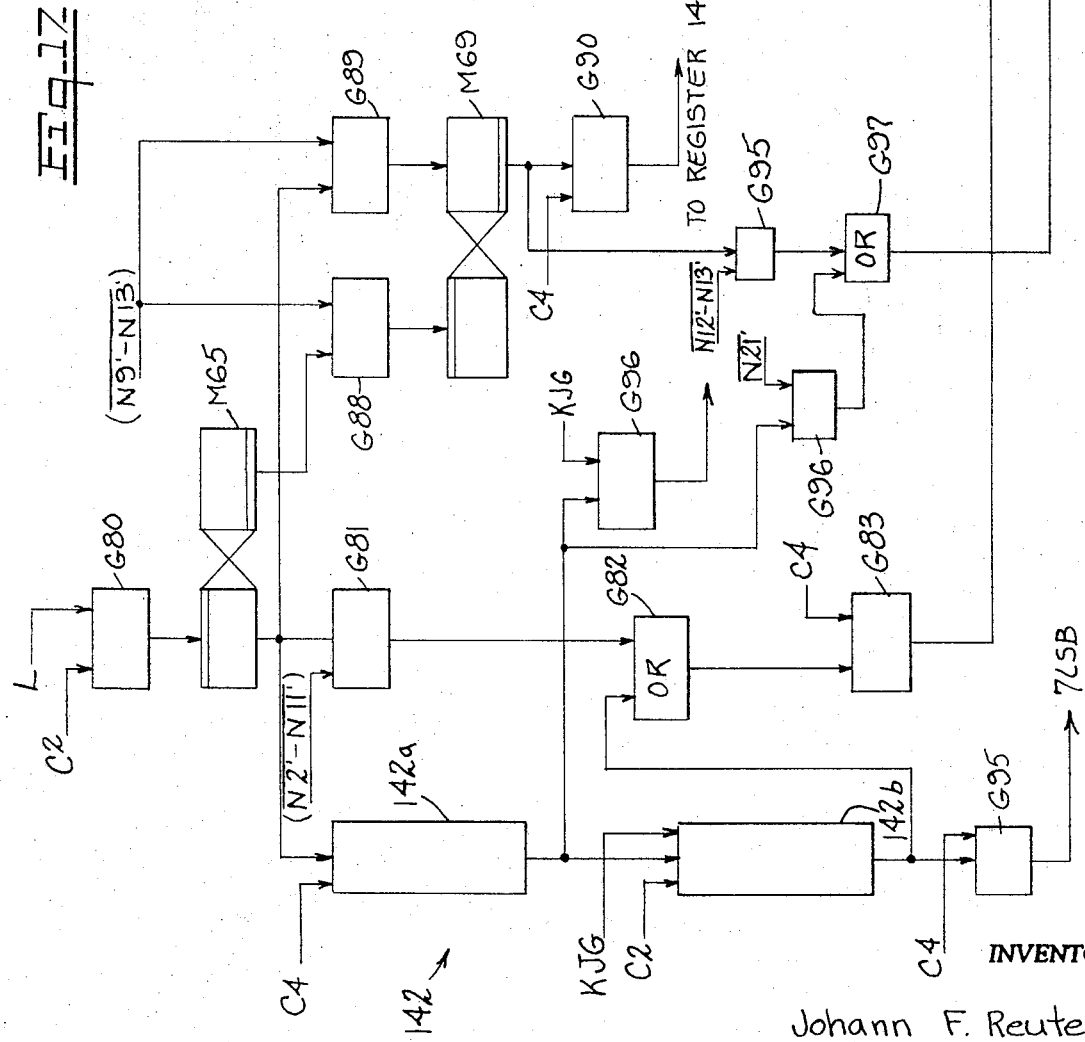
Fig. 17

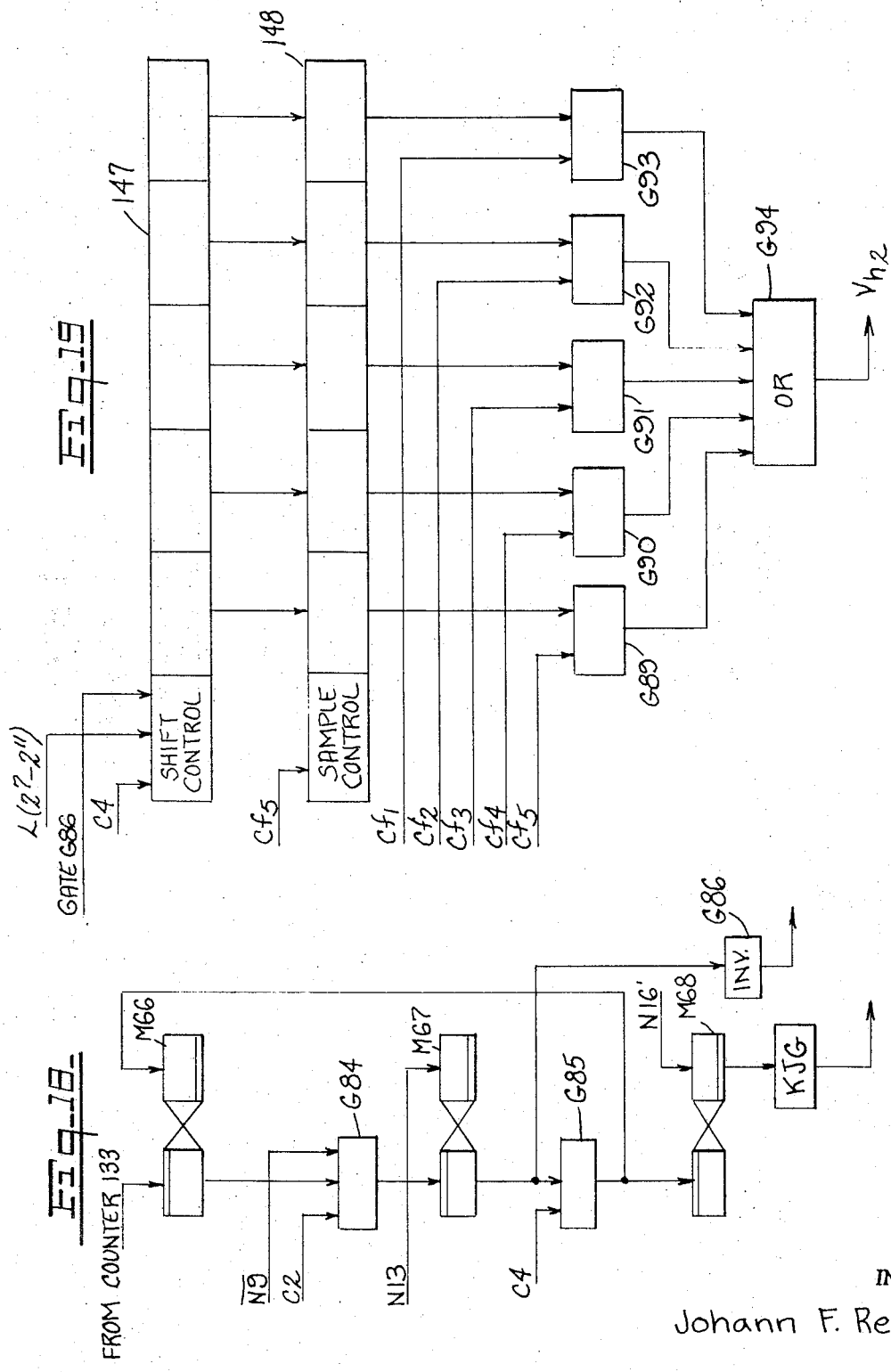

United States Patent Office 3,555,392
Patented Jan. 12, 1971

3,555,392
SERVO SYSTEM UTILIZING PULSE FREQUENCY PROPORTIONAL CONTROL
Johann F. Reuteler, Elmwood, Conn., assignor to Pratt & Whitney Inc., West Hartford, Conn.
Continuation-in-part of application Ser. No. 349,216, Mar. 4, 1964. This application May 5, 1969, Ser. No. 821,732
Int. Cl. G05b 19/28
U.S. Cl. 318—603    23 Claims

ABSTRACT OF THE DISCLOSURE

A numerical control servo system in which the position error or lag is converted to a pulse frequency proportional to the lag and where provision is made for varying the conversion factor as a function of the lag of a plurality of axes of movement.

This application is a continuation-in-part of copending application Ser. No. 349,216, filed Mar. 4, 1964, now U.S. Pat. 3,443,178.

This invention relates to servo systems and more particularly relates to servo systems of a type adapted to move an object from one point to another at a predetermined rate or velocity.

In digitally responsive servo systems wherein the distance and rate commands are given by a command pulse frequency and wherein the actual movement of an object is measured by a plurality of pulses which indicate the actual movement of the object, the number of pulses at any given time in the command pulse frequency represent the instantaneous commanded position. Therefore, the difference in the number of pulses representing the instantaneous commanded position and the number of pulses produced representing the actual movement is a time or position lag. This lag must be a rigid function of the velocity of the object in order to keep the tracking error zero under steady state conditions. These requirements are important in a system utilizing a plurality of servo systems where an object, such as a workpiece, is simultaneously moved with respect to a plurality of axes.

With these inherently existing position lags, it will be apparent that a number of command pulses will be generated to move each object its predetermined distance in a time less than that required for movement of the objects in the commanded end position. This produces a problem in decelerating the objects so that the object accurately stops at its commanded end point without undershoot or overshoot, and further without undue use of time.

The present invention provides new and improved servo techniques adapted to entirely digitally control the motion of objects simultaneously with respect to the plurality of reference paths. The invention provides new and improved means for comparing the instantaneous commanded position with the actual position to determine the lag and move the object proportional thereto with respect to a plurality of non-coincident reference paths where movement is controlled by a plurality of servo systems.

The invention further provides new and improved means for controlling the deceleration of the controlled objects as they simultaneously near their commanded end points as a function of the lags to decrease any deceleration stresses on the controlled parts and further to accurately stop all parts simultaneously at their respective commanded end points.

The present invention is particularly adaptable to numerically controlled machine tools and the servo systems therefor. The invention may be utilized with a numerical control system of the incremental type or of the absolute type. A system of the incremental type is described in U.S. Pat. 3,414,717 of Johann F. Reuteler and Edward E. Kirkham. In the incremental type numerical control, sometimes referred to as a contouring system, the plurality of parts move simultaneously along incremental paths to define an overall outline or contour or path which is defined in increments.

A point-to-point type numerical control in which a resultant path is defined through movement of a plurality of objects is disclosed in copending application, Ser. No. 349,216. In systems such as this, a resultant path is defined between a starting point and an end point through motion of two or more machine parts as, for example, the one coordinate axis slide and a cutting tool, and such path may either be on an arc or along a slope and several of such paths may be programmed consecutively to define a given contour or outline. The distinction between the incremental and absolute type of systems is that a plurality of rate and distance instructions is given for each increment of motion of an overall path in the incremental system, while in the absolute system the machine parts are instructed to move to predetermined points. This distinction is primarily in the type of instruction given to the control system for the numercial control.

The invention further provides a new and improved means for generating a pulse frequency proportional in number of pulses and in frequency to the magnitude of a numerical representation, and further indicative of the algebraic sign of the numerical representation. The invention further provides a new and improved means for controlling the frequency of said pulse frequency as a function of the lag of the machine parts.

This invention further provides new and improved means for generating a pulse frequency proportional in number of pulses and frequency to the magnitude of a numerical representation, and further indicative of the algebraic sign of the numerical representation.

Accordingly, an object of this invention is to provide a new and improved servo system.

Another object of this invention is to provide a new and improved servo system of a type which moves an object a distance proportional to a number of command pulses received and at a velocity proportional to the repetition rate of the pulses.

Another object of this invention is to provide new and improved means for generating a pulse frequency which is proportional in number of pulses and repetition rate to the magnitude of a number.

A further object of this invention is to provide a new and improved servo system for simultaneously moving a plurality of parts with respect to reference axes where the velocity of each part is a function of the lag of all axes.

The novel features of the invention are pointed out with particularity and distinctly claimed in the concluding portion of this specification. However, the invention both as to organization and operation together with further objects and advantages thereof may best be appreciated by reference to the following detailed description taken in conjunction with the drawings, in which:

FIG. 1 is a functional block diagram of a numerical control system including digital servo systems which is set forth for purposes of orientation;

FIG. 2 is a block diagram of a digital servo system;

FIG. 7 is a diagram, partly schematic and partly in block form of the position error register, sampling logic and number-to-frequency converter shown in functional block form in FIG. 2.

FIG. 12 is a functional block diagram of another numerical control system including digital servo systems in which the invention may be embodied;

FIG. 13 is a diagram in logical schematic form of a portion of FIG. 12;

FIG. 14 is a diagram of marker signal waveforms;

FIG. 15 is a block diagram of a servo system embodying a feature of the invention;

FIG. 16 is a diagram in logical schematic form of a portion of the servo system of FIG. 15;

FIG. 17 is a diagram in logical schematic form of a portion of the servo system of FIG. 15;

FIG. 18 is a diagram in schematic form of a timing circuit utilized in the invention;

FIG. 19 is a diagram in logical schematic form of a number-to-frequency converter; and FIG. 20 is a diagram in logical schematic form of a means for deriving a frequency which is a summation of the lags of all the axes.

GENERAL ARRANGEMENT

Figure 6:
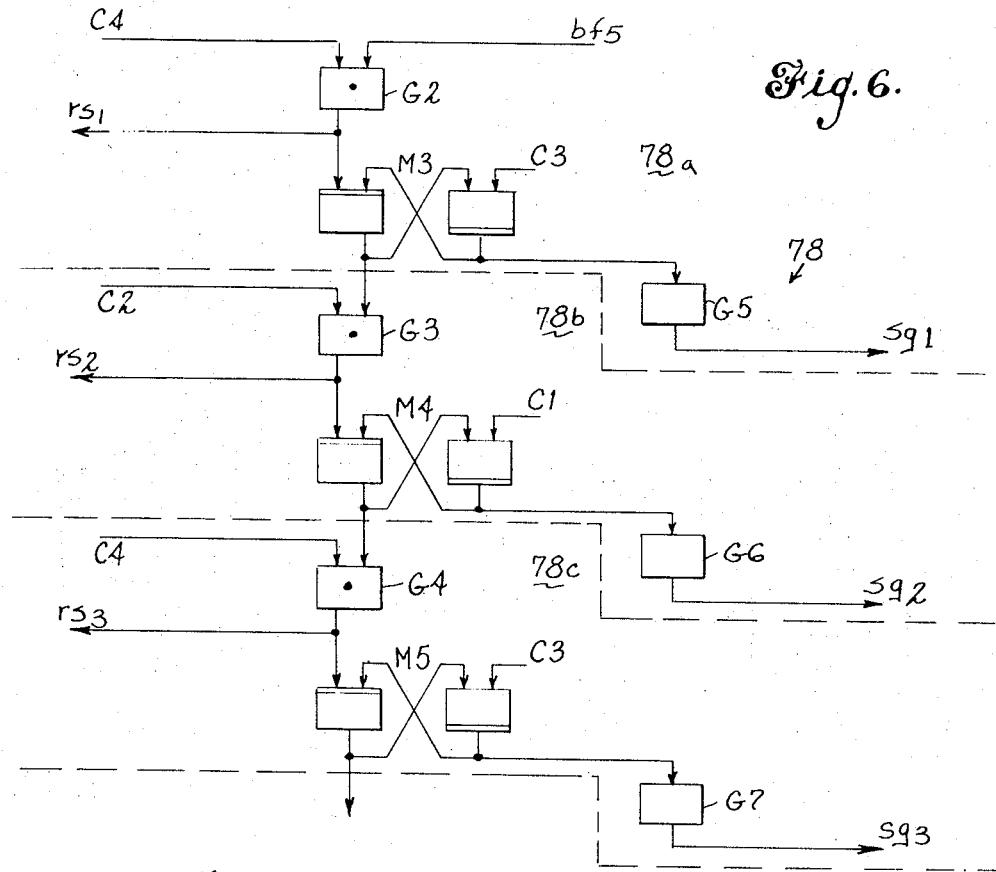
FIG. 6 is a schematic diagram of a serial pulse generator used for gating and resetting purposes.

A numerical control system including a plurality of digital servo systems which may embody the invention is first described functionally with reference to FIG. 1. The numerical control system of FIG. 1 is disclosed in detail and claimed in U.S. Pat. 3,417,303 of Johann F. Reuteler. The system of FIG. 1 controls the motion of a first controlled object, cutting tool 20, relative to a second controlled object, workpiece 21, with respect to a plurality of non-coincident reference paths here illustrated as mutually perpendicular X, Y and Z axes. Relative motion between the cutting tool 20 and workpiece 21 is achieved by moving a workpiece holder 22 in either direction with respect to the X-axis by means of a lead screw 23 driven by an X-axis prime mover 24 mounted on a bed or base 25. Bed 25 is moved in either direction with respect to the Z-axis by means of a lead screw 26 driven by a prime mover 27. Cutting tool 20 is carried in a spindle 28 driven by a motor 29 mounted on a base member 30. Base 30 is movable in either direction with respect to the Y-axis by means of a lead screw 31 driven by a prime mover 32.

The prime movers 24, 27 and 32 may be electrical or hydraulic servo motors which are operated in response to the output of X, Y and Z axes digital servos 35, 36 and 37.

The digital servos 35, 36 and 37 receive movement commands in the form of discrete pulses. Each pulse applied to a servo is a command indicative of a unit distance of movement of the object controlled thereby along a particular axis. The rate of movement of the objects controlled by each servo is determined by the rate of application of command pulses thereto.

The movement commands for each axis are derived from an external medium comprising in a preferred form a flexible, essentially continuous tape 38. Various commands are encoded in binary form in parallel columns on the tape 38. The commands are feedrate number FRN which determines, at least in part, the rate of production of command pulses and hence the workrate of the machine or part being controlled; delta X ($dx$) which determines movement of work holder 22 along the X-axis; delta Y ($dy$) which determines movement of base 30 and hence cutting tool 20 relative to work holder 22 with respect to the Y-axis; delta Z ($dz$) which determines movement of bed 25 and hence work holder 22 with respect to the Z-axis; and an end of block notation EB which signifies the end of a block of information on the tape. The delta or movement commands are represented by a binary number, each unit count of the number being equal to a predetermined increment of movement along a particular axis. The last perforation or absence thereof in the $dx$, $dy$ and $dz$ columns indicates the direction of movement; for example, the direction of movement in the X and Y directions in the illustrated example is positive as indicated by lack of a hole in the last space in that column, while the direction of movement in the Z-axis is negative as determined by the presence of a perforation in the last space in the $dz$ column. The number represented in binary form in the FRN column is a feedrate number FRN which primarily determines the rate in which command pulses are supplied to the servo systems, and consequently controls the rate of motion of the machine parts.

The channel designated EB contains the end of block indication, identified by the presence of a perforation at the end of that column. This code appears in the same row as that which contains algebraic signs of $dx$, $dy$ and $dz$. The EB code provides stops between commands so that one command may be distinguished from the next. The blocks of information may be of any predetermined length as needed and are made as long as the longest binary command of any of the delta or feedrate commands, within the capacity of the system as will hereinafter be made apparent. The blocks of information on the tape are successively fed into the system to insure continuous relative movement of cutting tool 20 with respect to workpiece 21. While the input medium has been illustrated as an essentially continuous tape having perforations thereon it will be understood that the input medium may take any suitable form.

The system comprises an input and temporary storage section identified by reference numeral 39 which comprises a tape reader 39a for reading the notations on tape 38 into the system, a stop and start control 39b which commences reading of a block of information from the tape and stops reading when the end of block notation is reached, logic means to determine the length of a block of information read, and a temporary storage section which stores the information on a block of tape before it is transferred to the interpolation section 40 of the system, as hereinafter described.

When a block of information has been read from the tape, the information in that block is maintained in binary notation in temporary storage registers until a signal from the interpolation section 40 of the system indicates that the previous block of information fed into the machine has been completely utilized. At this time the start and stop control 39b transfers the contents of temporary storage section 39d to interpolation and command generation section 40 of the system through a dump control 41 which comprises a plurality of coincidence gates (not shown in detail) which are enabled by a dump control gate 42. Gate 42 receives a signal from the tape reader stating that a block of information has been read, and also a signal from the interpolation section 40 of the machine stating that the previous block of information read in has been utilized, and the interpolation system is ready to receive the next block of information. At the time information is transferred from temporary storage to active storage in interpolation section 40, sign logic elements 44, 45 and 46 for each axis of motion are set in a state indicative of the direction of motion indicated on the block of tape for the block of information which has just been transferred.

When information has been transferred from temporary to active storage it must now be interpolated for use by the digital servos 35, 36 and 37. The interpolation section 40 of the system comprises a feedrate number storage register 47 which stores the feedrate number FRN in binary notation, a series of add gates 48 and a parallel adder 49 whose function is hereinafter described. The $dx$, $dy$ and $dz$ movement commands are stored in binary form in storage registers 50, 51 and 52, respectively. Storage registers 50, 51 and 52 each comprise a multiplicity of bi-stable devices which are set in a state indicative of the binary movement command for that axis.

The system includes a clock oscillator 54 which repetitively provides four clock signals, C1, C2, C3 and C4 as hereinafter explained in conjunction with FIG. 5. Clock oscillator 54 receives driving signals from an oscillator 53. One of the clock signals, here illustrated as C1, is applied to a binary frequency generator 55 which provides a plurality (seven as here illustrated) of binarily related frequencies $bf_1$–$bf_7$ where the pulses of each frequency are non-coincident with the pulses of the other frequencies. Binary frequency generator 55, in a preferred form, comprises a uni-directional serial pulse counter having a plurality of bi-stable devices and logic means to detect the occurrence of a non-carry, that is, when a stage of the counter changes from binary "0" to binary "1." Thus, a $bf_1$ pulse will occur every second clock cycle, a $bf_2$ pulse will occur every fourth clock cycle, a $bf_3$ pulse will occur every eighth clock cycle, etc.

Table I shows the number of $bf_1$–$bf_7$ pulses which will occur during one hundred twenty-eight clock cycles.

TABLE I

| | |
|---|---|
| Clock cycles | 128 |
| $bf_1$ | 64 |
| $bf_2$ | 32 |
| $bf_3$ | 16 |
| $bf_4$ | 8 |
| $bf_5$ | 4 |
| $bf_6$ | 2 |
| $bf_7$ | 1 |

In the following description reference will be made to various "pulse frequencies." These pulse frequencies are measured as a number of pulses in a number of clock cycles and do not necessarily relate to a constant repetition rate usually expressed as cycles/second.

The $bf_1$–$bf_7$ pulse frequencies or selected ones thereof are applied to a frequency controller 56 which comprises a means for gating selected ones of pulse frequencies $bf_1$–$bf_7$ therethrough to provide a selectable pulse frequency $f_1$. Pulse frequency $f_1$ is applied as enabling pulses to add gates 48. The application of $f_1$ pulses to add gates 48 enables the gates 48 to pass the numerical content of feedrate number storage register 47 to parallel adder 49. The feedrate number in binary form is thus added to the number in parallel adder 49 a number of times and at a rate determined by pulse frequency $f_1$. The parallel adder will thus produce an overflow pulse frequency $f_2$ which has a repetition rate proportional to the feedrate number FRN and the repetition rate of pulse frequency $f_1$. Pulse frequency $f_2$ is then passed to a command pulse generator 60 here illustrated as having eighteen binary stages. Command pulse generator is basically a uni-directional binary counter and further includes logic for detecting non-carrier to provide eighteen binarily-related pulse frequencies. Command pulse generator has the counting portion thereof preset with binary "1's" in the most significant positions thereof determined by the length of the block of information upon which it is then operating. Command pulse generator is preset from length of block logic section 39c of the input in temporary storage section 39. The command pulse generator output frequencies are then applied to non-carry pulse coincidence gates for each axis. Each of the blocks indicated by reference numerals 61, 62 and 63 comprise eighteen coincidence gates adapted to pass selected ones of the pulse frequencies from command pulse generator 60 when enabled by a binary "1" notation in a corresponding binary position of an associated axis command storage register. In the example given, the most significant position of an axis distance command gates the largest pulse frequency of command pulse generator 60. In this manner a number of command pulses are derived for each axis of motion which are equal to the binary movement command for that axis, and the command pulses derived are produced at a rate proportional to pulse frequency $f_2$, which is counted by command pulse generator. The pulse frequency outputs $f_x$, $f_y$ and $f_z$ of each of the non-carry pulse coincidence gates 61, 62 and 63 are applied to sign logic elements 44, 45 and 46, respectively, which determine the direction of motion of a controlled part with respect to each reference path. The $f_x$, $f_y$ and $f_z$ pulse frequencies are then applied to appropriate servos at either a positive or negative input. A positive input signifies that the servo system is to move its controlled object in a positive direction along its path of movement. A negative input signifies that the servo system is to move its controlled object in a negative direction along its path of movement.

SERVO SYSTEM

Each of the servo systems 35, 36 and 37 is identical. FIG. 2 illustrates in block form the Z-axis servo system 37. Servo system 37 is a second order or two-loop servo system in which a servo amplifier 70 receives pulse inputs directly without requiring a digital-to-analog converter. Servo system 37 includes a means for generating discrete feedback pulses $f_q$, each proportional to an incremental distance of movement of a controlled object, here illustrated as bed 25. The pulse generating means comprises an element generally referred to as a quantizer 71 which provides output pulses $f_q$ over a positive or negative output line determined by the direction of movement of the controlled part with respect to its particular axis of movement. The quantizer 71 in a preferred form comprises a shaft encoder 72, mechanically connected to either the prime mover or lead screw 26, which furnishes output waveforms, each comprising a number of pulses indicative of the rotation of lead screw 26 and so related in phase as to indicate the direction of rotation of lead screw 26. The output waveforms of shaft encoder 72 are applied to pulse shaping networks which are preferably Schmitt trigger circuits 73, well known to those skilled in the art. The output of the Schmitt triggers are applied to a decoding network 74 which senses the direction of rotation of lead screw 26 and provides a pulse frequency output $f_q$ over either a positive or negative output line. The output pulses $f_q$ are each indicative of an incremental movement of the controlled member bed 25 which increment of movement is equal to the increment of movement commanded by each command pulse $f_z$. A quantizer 71 of the type described herein is illustrated in detail in copending application Ser. No. 349,216, now Pat. 3,443,178, and the disclosure thereof is incorporated herein by reference.

Servo system 37 further comprises a pulse adder 75 which accepts plus or minus $f_z$ and $f_q$ pulses and applies $f_z$ and $f_q$ pulses to an error register 76. Error register 76 stores a numerical count proportional to the difference in the number of $f_z$ command pulses and feedback $f_q$ pulses received thereby. This numerical count represents the system position error. Error register 76 comprises an eight-stage bidirectional counter as hereinafter more fully described and a ninth-stage which determines the algebraic sign of the number held therein. Pulse adder 75 passes $f_z$ or $f_q$ pulses to error register 76 to either increment or decrement error register 76 dependent upon the sign of the pulse. If $f_z$ and $f_q$ pulses occur simultaneously they are algebraically added by pulse adder 75 before being passed to error register 76.

The numerical content of error register 76 is sampled every thirty-two clock cycles by a sample logic network 77 controlled by a sample control register 78 which in turn is activated by a $bf_5$ pulse which occurs every thirty-second clock cycle. Sample control register 78, as will hereinafter be more fully described, is in effect a shift pulse generator having a number of shift stages which sequentially generate shift pulses $sf_1$–$sf_8$ in response to application of a $bf_5$ pulse thereto. The shift, or as hereinafter specified, sample pulses $sf_1$–$sf_8$ occur every half clock cycle, commencing every thirty-second clock cycle.

The sampled numerical content of error register 76, which is stored in sample logic network 77 every thirty-second clock cycle is applied to a number-to-frequency converter 79, which produces a pulse frequency $f_p$, having a number of pulses proportional to the sampled numeric content of error register 76. Pulse frequency $f_p$ is immediately applied over line 80 through a pulse shaper 81 to servo amplifier 70. Pulse frequency $f_p$ is also applied through a sign logic element 79a and hence over a line 79b or 79c dependent upon the algebraic sign of the sampled number to a servo register 82 through a second pulse adder 83. Pulse adder 83 also receives positive or negative $f_q$ pulses from quantizer 71 and functions in the same manner as previously described for pulse adder 75. The pulses $f_p$ and $f_q$ are applied to servo register 82, which is substantially identical to error register 76, to either increment or decrement the number in servo register 82. The number stored in servo register 82 represents the system velocity error. A second sample logic network 84 is provided to sample the numerical content of servo register 82 under the control of sample control register 78. This numerical content of sample logic network 84 is then applied to number-to-frequency converter 85 which provides an output pulse frequency $f_v$ having a number of pulses proportional to the sampled numerical content of servo register 82. Pulse frequency $f_v$ is then passed to servo amplifier 70, through a pulse shaper 86. The quantizer output pulses $f_q$, both positive and negative, are passed by an OR gate 87 to servo amplifier 70 through a pulse shaper 88. The pulse shapers 81, 86 and 88 as hereinafter explained receive $f_p$, $f_v$ and $f_q$ pulses, respectively, and shape each pulse into corresponding pulses, all having equal amplitude and pulse widths.

The function of the sample logic networks 77 and 84 is to sample the numbers in registers 76 and 82 to provide static storage of the numbers therein for conversion to a pulse frequency. This is to provide a number for conversion to a frequency which is not subject to change by borrows or carries propagating through the counter.

Figure 2A:
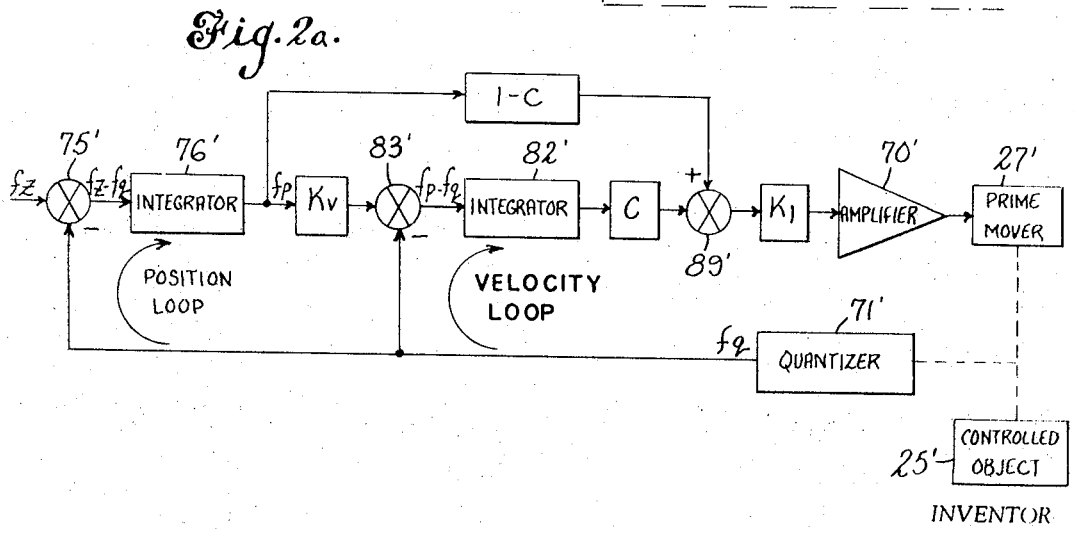
FIG. 2a is a functional diagram of the servo system of FIG. 2 and aids in functionally explaining the operation thereof.

Reference is now made to FIG. 2a which aids in an explanation of the features of the servo system of FIG. 2. FIG. 2a shows a functional development of the system of FIG. 2. In FIG. 2a the command pulse frequency $f_z$ is applied to a summing device 75' at a rate indicative of the commanded velocity of the controlled part, bed 25. The feedback pulse frequency $f_q$ is also applied to summing device 75' at a rate indicative of the actual velocity of the controlled part. The algebraic summation of the $f_z$ and $f_q$ pulses produces a velocity error $f_z$–$f_q$ which is the numeric count summed by an integrator 76' corresponding to error register 76 and associated number-to-frequency converter. The algebraic summation of $f_z$ and $f_q$ pulses is in effect an integration of the servo system velocity error which results in a numerical magnitude representing the system position error. This position error is then converted to a pulse frequency $f_p$ proportional to the position error. The repetition rate of pulse frequency $f_p$ thus represents a velocity that is a function of the system position error.

Then $f_p$ pulses are algebraically summed with $f_q$ at summing device 83'. This results in a pulse frequency $f_p$–$f_q$ which is proportional to the required velocity change to eliminate the velocity error. The pulse frequency $f_p$–$f_q$ could be utilized to control the prime mover 27' directly to minimize the system velocity error. In the disclosed servo system the same quantizer is utilized to establish both the position and velocity loops.

The pulse frequency $f_p$–$f_q$ is statically stored as a number in integrator 82' and this number is converted to a pulse frequency $f_v$. Pulse frequencies $f_p$ an $f_v$ are summed by a summing device 89' and applied to amplifier 70' to control operation of prime mover 27'.

In FIG. 2a, the block indicated as $K_v$ represents the velocity lag constant of the system, and the block indicated as $K_1$ represents the gain of the velocity loop. The blocks indicated as C and 1–C represent the relative weights given $f_p$ and $f_v$ at summing device 89'. As will hereinafter be explained summing device 89' may be made a portion of the overall arrangement of amplifier 70' and these relative weights may be made variable.

It may be seen that as the quantity C approaches zero the inner or velocity loop is opened and the system approaches one of the first order. Values of C greater than zero, but less than one, may produce variable values of the position loop gain without affecting the velocity lag constant $K_v$. When C is equal to one, the system becomes a normal second order system with a gain of $K_v K_1$.

In a servo system of the type described the velocity lag constant and the velocity gain constant present opposing requirements. The velocity lag constant which is the gain of the outer or position loop influences the transient response of the system. The ability to control the position loop gain, which affects transient response, without affecting the velocity lag constant $K_v$ is extremely valuable in optimizing system performance. A preferred technique of accomplishing such adjustment is explained hereinafter in conjunction with servo amplifier 70.

CIRCUIT ELEMENTS

Figure 3A:
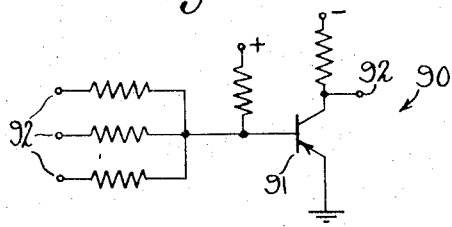
FIGS. 3a and 3b are diagrams illustrative of a logical circuit element which may be utilized in various components comprising a system embodying the invention.
Figure 3B:
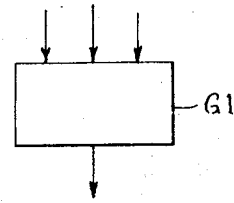

In a preferred form of the invention, as will hereinafter be described, the various components thereof are preferably constructed from the well-known NOR circuit, illustrated schematically in FIG. 3a. NOR element or circuit 90, as illustrated, comprises a PNP transistor 91, in a grounded emitter configuration, having a plurality of inputs 92 to the base thereof. As will be apparent from FIG. 3a there will be an output voltage (negative) at the collector 92 of transistor 91 whenever there is no negative input signal to the base of transistor 91. If there should be a negative input of sufficient magnitude to the base of transistor 91 the transistor will switch on and the collector will then go to ground. When transistor 91 is cut off the collector will essentially be at the supply voltage. All NOR elements hereinafter illustrated are operated in a switching mode. When transistor 91 is in a conductive state this may be considered a "0" output and when it is cut off it may be considered to have a "1" output. In the circuits hereinafter explained the NOR circuit of FIG. 3a will be illustrated as shown in FIG. 3b which is designated as gate G1. FIG. 3b illustrates the NOR element as it is used as an OR gate or merely for purposes of inversion. When the NOR element is used as an "AND" or coincidence gate a dot will be placed in the middle of the block forming gate G1. It will be apparent that the NOR element will provide a "1" output when all of the inputs thereto are "0."

Figure 4A:
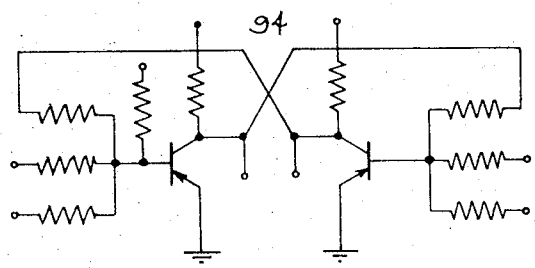
FIGS. 4a, 4b and 4c are diagrams of a bistable device.
Figure 4B:
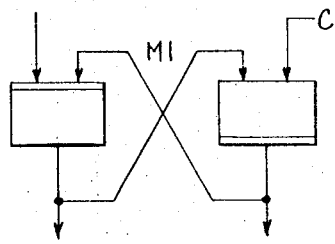
Figure 4C:
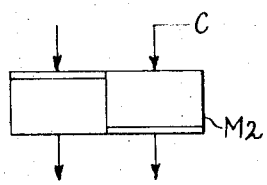

The NOR elements may be utilized to provide bi-stable devices 94 as illustrated in FIG. 4a. For simplicity of illustration the bistable flip-flop 94 of FIG. 4a is hereinafter illustrated as shown in FIG. 4b and designated as memory M1 or as shown in FIG. 4c and designated memory M2. The operation of these bistable devices is well known to those skilled in the art and no description of such operation need be made here. It will be understood, of course, that the particular circuit elements here shown are set forth only to disclose a preferred embodiment of the invention. As shown in FIGS. 4b and 4c the input designated by the letter C represents a clock pulse which may be applied to either side of the flip-flop for setting or resetting. In many instances a memory or gate will be shown as having a multiplicity of inputs which could not be practically achieved in a single transistor. In such instances it will be understood that a plurality of NOR elements may be arranged in parallel to provide the necessary circuit component.

Figure 5:
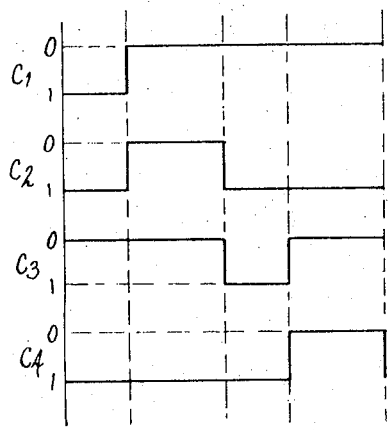
FIG. 5 is a diagram of the waveform of the clock oscillator of FIG. 1.

The timing of the operation and sequence of events of the interpolation and servo systems is controlled by clock pulses, C1, C2, C3 and C4 which are graphically illustrated in FIG. 5. The clock pulses vary between "0" voltage and a predetermined negative voltage hereinafter referred to as a "1" voltage level. Each clock pulse consists of a short pulse of one voltage level followed by a longer pulse of the other voltage level. The operating portion of each clock pulse is the short pulse portion. As will hereinafter be made apparent the odd clock pulses C1 and C3 are utilized primarily to reset bistable devices hereinafter referred to as memories, while the even clock pulses C2 and C4 are used primarily for gating purposes. Each clock cycle which consists of the four clock pulses, C1, C2, C3 and C4 is uniform in time and continuously repetitive when the system is in operation. Clock oscillator 54 is described in detail in U.S. Pat. 3,417,303 of Johann F. Reuteler.

SERVO SYSTEM COMPONENTS

The components of servo system of FIG. 2 will now be described in detail sufficient to disclose the operation thereof. The details of construction vary in some respects from the system diagram of FIG. 2 and such differences will hereinafter be pointed out, if not made apparent.

Reference is now made to sample control register 78, illustrated schematically in FIG. 6. The function of sample control register 78 is to provide a plurality of gating signals $sg_1$–$sg_8$ which sequentially occur every one-half clock cycle commencing every thirty-second clock cycle and are initiated by a $bf_5$ pulse from binary frequency generator 55. Sample control register 78 also provides resetting signals $rs_1$–$rs_8$ for bistable elements in sample logic 77 every one-half clock cycle, commencing with every thirty-second clock cycle and initiated by a $bf_5$ pulse from binary frequency generator 55. In the illustrated embodiment, sample control register 78 comprises a plurality of pulse generating stages, three of which are illustrated in FIG. 6.

Every thirty-second clock cycle upon occurrence of a $bf_5$ pulse gate G2 is enabled at C4 to provide a setting signal to memory M3. The "1" output of gate G2 also provides a resetting signal $rs_1$. When the output of gate G2 sets memory M3, the left side of memory M3 has a "0" output and one-half clock cycle later at C2 gate G3 supplies a resetting signal $rs_2$. The signal $rs_2$ also sets the left side of memory M4 which then has a "0" output and one-half clock cycle later at C4, gate G4 supplies another resetting signal $rs_3$. The output signal from gate G4 also sets memory M5. The remaining stages of the sample control register 78 are similar to stages 78a, 78b and 78c, illustrated in FIG. 6, and provide sequentially every half clock cycle resetting signals $rs_4$–$rs_8$.

Each of the stages of the sample control register also provides a sample gating signal each half clock cycle. When memory M3 of stage 78a is reset at C3 the output of the right side of memory M3 goes to "0" and is applied to an inversion gate G5 which yields a "0" gating signal except when memory M3 is reset by C3. It may thus be seen that when gate G2 sets memory M3 and provides a resetting signal $rs_1$, gate G5 will supply a "0" level gating signal $sg_1$. In a similar manner in stage 78b, gate G6 provides a "0" gating signal $sg_2$ at the same time gate G3 provides resetting signal $rs_2$. Also, stage 78c provides a gating signal $sg_3$. The gating signals $sg_1$–$sg_8$ occur sequentially every one-half clock cycle commencing every thirty-second clock cycle. The resetting signals $rs_1$–$rs_8$ and the gating signals $sg_1$–$sg_8$ are utilized as hereinafter explained.

Reference is now made to FIG. 7 which illustrates in more detail the operation of pulse adder 75, error register 76, sample logic 77, number-to-frequency converter 79 and sign logic 79a, shown in block form in FIG. 2. Error register 76 comprises a binary bidirectional counter having eight stages 76a–76h and a directional sign element or stage 76i. As illustrated, the least significant bit is held in stage 76a and the most significant bit is held in stage 76h, The bidirectional counter receives either incrementing or decrementing pulse inputs from pulse adder 75. In a preferred embodiment, as hereinafter described, pulse adder is constructed integral with stage 76a. The pulse adder 75 receives command and feedback pulses and provides the pulses of frequency $f_z$–$f_q$ to error register 76. This pulse frequency $f_z$–$f_q$ is the servo system velocity error.

Every thirty-second clock cycle under the control of sample control register 78 the number held in binary form in register 76 is sampled and held in sample storage memories M6–M14 each of which store the bit of a corresponding stage 76a–76i, respectively. Memories M6–M14 are reset by the resetting signals $rs_1$–$rs_8$ derived from sample register 78, previously explained. Sample memories M6–M14 are set by the outputs of gates G8–G16, respectively, every thirty-second clock cycle when enabled by one of gating signals $sg_1$–$sg_8$ at a gating clock pulse C2 or C4. When sampling occurs every thirty-second clock cycle memories M6–M14 are sequentially reset every one-half clock cycle and then sequentially set (dependent on the presence of a bit in an associated register stage) by a signal from an associated one of gates G8–G15. In operation, upon occurrence of a $bf_5$ pulse memory M6 is reset at C4, simultaneously and $sg_1$ gating signal is applied to gate G8. However, gate G8 cannot apply a setting signal to memory M6 until C2. Memory M7 is reset at the same C2 pulse which enables gate G8. However, gate G9 cannot set memory M7 until the following C4 pulse.

As will hereinafter be explained a "borrow" or "carry" bit propagating through the stages of error register 76 propagates at a rate of one stage every half clock cycle. It may thus be seen that the sequential sampling of the stages of error register 76 occurs at the same time as the time of propagation of an increment or decrement therethrough. The function of the sample logic and sampling control is to store the information in error register 76 in a static storage at a time when no carries or borrows are popagating through the stage of the counter being sampled.

The binary number held in static storage in sample logic 77 is converted to a pulse frequency $f_p$ having a number of pulses proportional to the numerical content of the sample memories. This number-to-frequency conversion is accomplished through the provision of coincidence gates G17–G25 and binary frequency generator pulse frequencies $bf_1$, $bf_2$, $bf_3$, $bf_4$ and $bf_5$. Pulse frequency $f_p$ is actually comprised of two pulse frequency components $f_{pc}$ and $f_{pf}$. Pulse frequency $f_{pc}$ is termed the coarse position error pulse frequency, while $f_{pf}$ is termed the fine position error pulse frequency. Pulse frequency $f_{pc}$ is derived from the bits in the four higher order stages of register 76 while pulse frequency $f_{pf}$ is derived from the bits in the four lower order stages. The reasons for division of pulse frequency $f_p$ into two components is hereinafter made apparent.

Let it be assumed that all of sample memories M10–M13 are set in a condition indicative of a binary "1" in counter stages 76e, 76f, 76g and 76h and that sign memory M14 is set in a condition indicating that the numeric representation in register 76 is positive. Then gates G25, G24, G23, G22 and G21 will pass frequencies $bf_1$, $bf_2$, $bf_3$, $bf_4$, and $bf_5$, respectively. These frequencies $bf_1$–$bf_5$ are then summed in an OR gate 95 to provide pulse frequency $f_{pc}$ a component of pulse frequency $f_p$. Dependent upon the commanded direction of movement, that is, positive or negative directions, a component of pulse frequency $f_{pc}$ will pass through one of gates G28 or G29 to an appropriate input of servo register 82, or more spuecifically, pulser adder 83. If the number held in counter 76 is positive, memory M14 will be set in a state indicative thereof and will enable gate G25 to pass the highest order frequency $bf_1$ which occurs every other clock cycle. Therefore, when the sampled content of error register 76 is positive, pulse frequency $bf_1$ will be present in the output of OR gate G27. However, when the sign logic stage 76i is sampled and it is determined that the numerical content of error register 76 is negative then memory M14 will inhibit gate G25 and pulse frequency $bf_1$ will not be present in the output of OR gate G27.

It is the presence or absence of pulse frequency $bf_1$, which occurs every other clock cycle, in the output of OR gate G27 which indicates the algebraic sign of the numerical content of error register 76. The pulse output $f_{pc}$ of OR gate 95 is applied to coincidence gates G28 and G29 which are selectively enabled by sign memory M14 dependent upon the state thereof which in turn is dependent upon the information received from sign logic stage 76i of error register 76. The pulse frequency $f_{pc}$ is applied directly to servo amplifier 70 through a pulse shaper. Also, pulse frequency $f_{pc}$ is applied to gates G28 and G29 prior to application to servo register 82. As will hereinafter be explained, the frequency component $bf_1$ is removed from the pulse frequency outputs of gates G28 and G29 which are designated $+f_{pc}'$ and $-f_{pc}'$, respectively.

OR gate 96 provides an output pulse frequency $f_{pf}$ which is designated the fine position error frequency output. Frequency $f_{pf}$ is a summation of the pulses received through gates G17, G18, G19 and G20 which are enabled by sample memories M6, M7, M8 and M9, respectively. Gates G17, G18, G19 and G20 when enabled pass pulse frequencies $bf_5$, $bf_4$, $bf_3$ and $bf_2$, respectively. From a pulse rate standpoint in relation to the significance of the binary digits in stages 76a, 76b, 76c and 76d of error register 76, the fine pulse frequency $f_{pf}$ is increased by a factor of sixteen.

The purpose of raising the frequency of the fine pulses $f_{pf}$ by $2^4$ to decrease the spacing between pulses of the resultant $f_{pf}$ pulse frequency from gate 96 when this pulse frequency is applied to the servo amplifier. This increase in the frequency of the $f_{pf}$ pulses is subject to later compensation as hereinafter described. The increase in the frequency of $f_{pf}$ while preferred is not absolutely essential.

From the foregoing discussion it is apparent that the numerical content of error register 76 is converted into a pulse train $(f_{pc}'+f_{pf})$ having a number of pulses proportional to the number held in error register 76 in binary form, and is also converted into a pulse frequency.

Reviewing briefly, the function of error register 76 is to integrate the velocity error which is a pulse frequency $f_z-f_q$. The result of this integration is the numerical count in the register which represents the difference between commanded position and actual position. The total numbero of pulses produced from OR gates 95 and 96 are proportional to this magnitude of the error. Incrementing or decrementing pulses from pulse adder 75 are introduced only into the least significant bit stage of the error register, carries or borrows are propagated to the adder in a manner known in the operation of a bidirectional counter. As will hereinafter be explained in more detail sign logic stage 76i comprises a bistable or memory device which is normally set to indicate a positive count in the error register. However, when the numerical content of the register is representative of a negative error, a borrow is immediately propagated along the stages of the error register which sets the sign memory to a state indicative of a negative error. The sign logic stage 76i will then cause gate G25 to be inhibited and pulse frequency $bf_1$ will not be present in the output of gate G27. To illustrate the manner in which the presence or absence of pulse frequency $bf_1$ determines the direction of the error, reference is made to Table II.

TABLE II

| Error register content | Arabic | Binary | $f_{pc}/512$ Clock cycles |
|---|---|---|---|
| Condition: | | | |
| 1 | 0 | 00000000 | $bf_1=256$ |
| 2 | 176 | 10110000 | $bf_1+(bf_2+bf_4+bf_5)=432$ |
| 3 | −176 | −01010000 (complemented) | $bf_3+bf_5=80$ |

At Condition 1 the numerical error in register 76 is zero. Under such conditions sample sign memory M14 will be set to show a positive mode of operation and pulse frequency $bf_1$ wil be gated to OR gate 95 through coincidence gate G25 every other clock cycle at C4. Pulse frequency $f_{pc}$ will then consist solely of pulse frequency $bf_1$ and will be applied to servo amplifier 70 through pulse shaper 81, FIG. 2. Assume now that a positive error of one hundred seventy-six exists at Condition 2. Under such conditions stages 76e, 76f, and 76h of error register 76 will be set to denote a binary "1" and sign logic stage 76i will be set to denote a positive error. Therefore, the output of OR gate 95 will be in the sum of $$bf_1+(bf_2+bf_4+bf_5)$$

or four hundred thirty-two pulses in a time of five hundred twelve clock cycles. The difference here between the output of OR gate 96 which is $f_{pc}$ and $bf_1$ is one hundred seventy-six pulses.

Now assume the error register 76 returns to a numerical content of zero and decrementing pulses are applied thereto until the numerical error denoted therein is minus one hundred seventy-six. By virtue of inherent construction of a binary bidirectional counter as will hereinafter be exemplified, this minus error will be denoted as the complement of an identical positive error and error register stages 76e and 76g will be set to denote the presence of a binary "1." However, in establishing this binary representation of a negative error a "borrow" has propagated to sign logic stage 76i which through gate G16 at the next sampling time sets sample sign memory M14 in a state indicative of a negative error. The output of the left side of memory M14 will then inhibit gate G25 and prevent passage of pulse frequency $bf_1$ therethrough. Therefore, the output $f_{pc}$ of OR gate 95 will be the sum of $bf_3$ plus $bf_5$ passed through gates G22 and G23. In this instance the $-f_{pc}$ pulses from gate G29 will total eighty in a time of five hundred twelve clock cycles. From an inspection of Table II it will be noted that $f_{pc}$ pulses for a given positive numerical error will bear a similar absolute relationship to pulse frequency $bf_1$ as the same negative numerical error. In the example given, the $f_{pc}$ pulses total one hundred seventy-six greater than $bf_1$ in the stated number of clock cycles while the $-f_{pc}$ pulses are one hundred seventy-six less than the $bf_1$ pulses in the stated number of clock cycles.

The presence or absence of pulse frequency $bf_1$ in pulse frequency $f_p$ thus establishes the sign of the numerical representation of the position error in error register 76. At this point it is apparent that the summation of the position command pulses $f_z$ and the actual position pulses $f_q$ in error register 76 comprises an integration of the velocity error. The subsequent conversion of the position error number in register 76 to a pulse frequency $f_p$ provides a pulse frequency representing a velocity error proportional to the position error. This velocity signal is then utilized as will hereinafter be explained.

Figure 8:
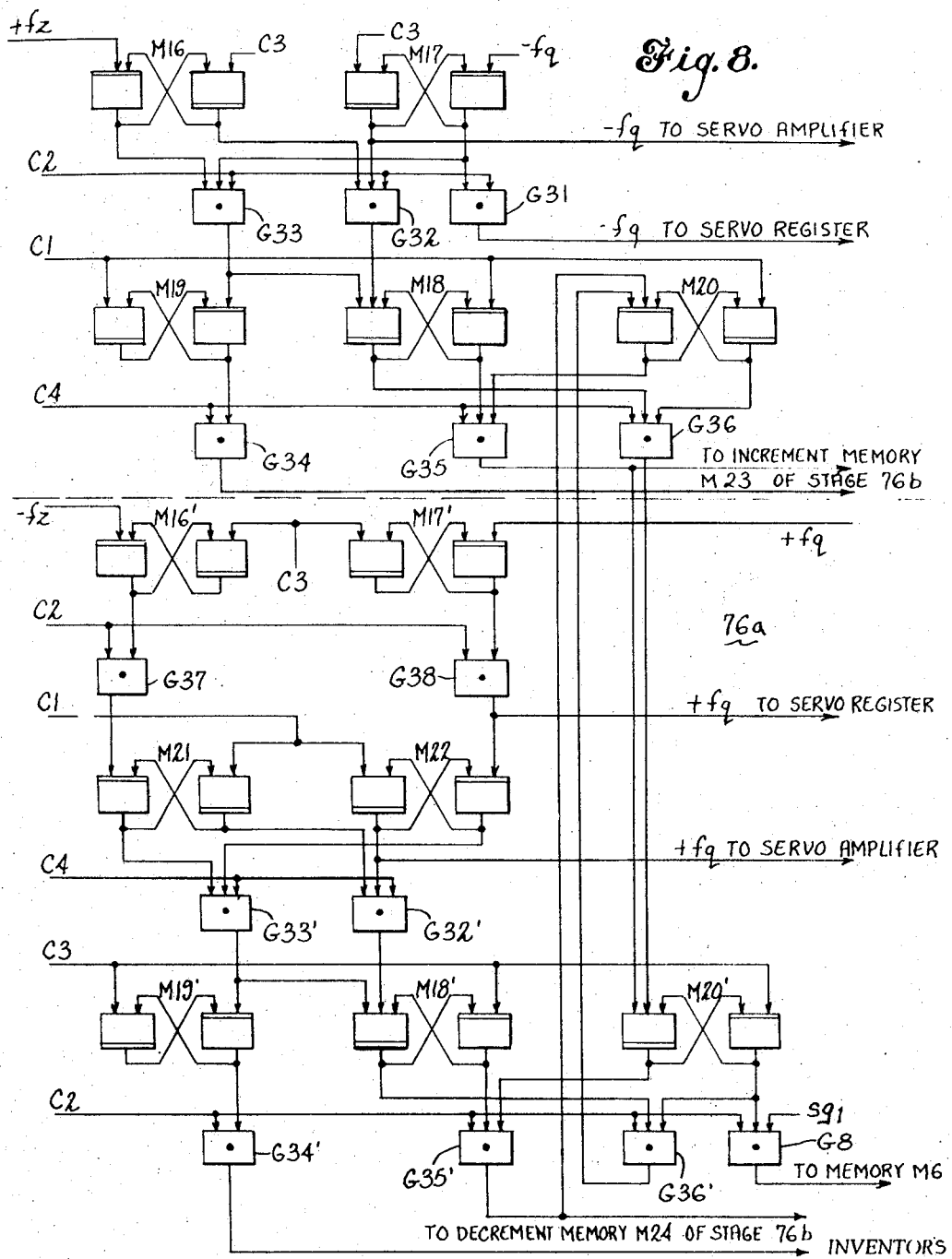
FIG. 8 is a schematic diagram of the input stage of a bidirectional counter, comprising the error register of FIG. 7, adapted to receive incrementing and decrementing pulse inputs.

Reference is now made to FIG. 8 which illustrates schematically the first stage 76a of the bidirectional counter forming error register 76, including pulse adder 75.

Stage 76a is arranged to receive four pulse inputs $f_z$, $f_q$, $-f_z$, and $-f_q$ pulses. Stage 76a generally comprises an incrementing portion shown above the broken line and a decrementing portion shown below the broken line. The elements of the two portions are substantially identical in construction and function, and elements in the decrementing portion corresponding to those of the incrementing portion bear the same identifying reference numeral primed.

In the incrementing portion $f_z$ command pulses are applied to memory M16 and $-f_q$ pulses are applied to memory M17. If an $f_z$ and a $-f_q$ pulse are both received in the same clock cycle, gate G33 senses this simultaneous receipt and then sets memory M19. When memory M19 is set it indicates that two incrementing pulses have been received during the same clock cycle and therefore a carry pulse must be forwarded to the next stage of the counter. Gate G34 senses the set condition of memory M19 and forwards the carry pulse to stage 76b. When gate G33 senses that two incrementing pulses have been received during the same clock cycle it also resets memory M18. Memory M18 is referred to as the incrementing memory of stage 76a. Memory M18 is set every clock cycle at C1 to a state indicative of the presence of an incrementing input. However, if there has been no incrementing input at C2 it is reset by gate G32. Gate G32 senses when there has been no incrementing input to either memory M16 or M17 and resets memory M18 in response thereto. If memory M18 is not reset at C2 it is indicative of the fact that a single incrementing pulse has been received by either M16 or M17.

Memory M20 functions to hold an error bit which is presently in the stage for one-half of a clock cycle. If an error bit is presently in the stage as indicated by a set condition of memory M20 and memory M18 is set to a condition indicative of receipt of one incrementing pulse, gate G35 senses the contents of memory M18 and M20 and in response thereto forwards an incrementing pulse to the incrementing memory of next higher order stage 76b. At the same time the output of gate G35 resets memory M20' which is the complement of memory M20. Memory M20' holds an error bit presently in the stage during the second or decrementing half of a clock cycle. If gate G35 resets memory M20' it is indicative of the fact that the contents of memory M18 and memory M20 have been added to produce a carry bit to the next stage and no sum bit remains. Gate G36 senses the condition existing when there is no incrementing bit in memory M18 and when no error bit is present in memory M20 thus indicating there is no bit, either incrementing or present error, in the incrementing portion of stage 76a. When gate G36 senses the absence of an increment and an error bit, it resets memory M20'.

Reference is now made to the decrementing portion of the stage. Decrementing pulses $-f_z$ or $f_q$ are applied to memories M16' and M17', respectively. The condition or stage of memories M16' and M17' is sensed by gates G32' and G33'. However, a delay network comprising memories M21 and M22 and associated gates G37 and G38, respectively, are interposed therebetween to provide a one-half clock cycle delay. When both a $-f_z$ and a $+f_q$ pulse are received during the same clock cycle, memories M21 and M22 will be set to a state indicative of such receipt at C2. At C4, gate G33' will sense the receipt of two decrementing pulses and set memory M19' in response thereto. Then on the following C2 pulse, gate G34 will forward a decrement or "borrow" to the decrement memory of the next higher order stage 76b. Memory M18' is the decrementing memory of stages 76a. At clock pulse C3 memory M18 is set to a state indicative of receipt of one decrementing input. On the following C4 clock pulse, memory M18' is reset by gate G33', if two decrementing pulses have been received or by gate G32' if no decrementing pulses have been received. If a single decrementing pulse, either $f_q$ or $-f_z$ is received gate G32' is inhibited and memory M18' is not reset.

As previously stated memory M20' holds an error bit presently in the stage, if in the stage, during the decrementing one-half of a clock cycle. Memory M20' is set every clock cycle at C3 to a state indicative of the existence of an error bit in the stage and remains in that condition unless reset by one of gates G35 or G36 on the following C4 clock pulse. Assume that memory M20' was not previously reset by gates G35 and G36. This indicates that an error bit is held in memory M20'. Further assume that memory M18' has been reset thus indicating that there is no decrement stored therein. Under such conditions, gate G35' will be inhibited. However, gate G36' will sense the error bit held in memory M20' and further sense that memory M18' holds no error bit. Upon sensing these conditions gate G36' will apply a signal to memory M20 to set it in a state indicative of an error bit presently in the stage. Assume during the next clock cycle memory M18 is set to a condition indicative of receipt of one incrementing input, gate G35 will sense the present error in memory M20 and the incrementing input in memory M18 and in response thereto will forward a "carry" or incrementing pulse to the incrementing memory M23 of stage 76b. At the same time gate G35 at C4 resets memory M20' to a state which indicates that there is no error presently in the stage.

At this time assume that a decrementing input is received by stage 76a. At clock pulse C3 memory M18' will be set indicating that a decrementing pulse is present. Due to the fact that a decrementing pulse has been received neither gate G32' nor gate G33' will reset memory M18'. Therefore, the binary "1" bit in memory M18' must be subtracted from the "0" in memory M20. It is known from the rules of binary arithmetic that the result of such subtraction will be retention of an error bit in stage 76a and a decrement or "borrow" pulse to stage 76b. Gate G35' senses that memory M20' is in a reset or "0" condition and that memory M18' is in a set or "1" condition and in response thereto will forward a borrow pulse to decrement memory M24 of stage 76b, and simultaneously set memory M20 to a state indicative of a present error bit of "1."

From the foregoing, the operation of stage 76a which includes the function of pulse addition is now apparent. The summing function of stage 76a effectively produces a pulse frequency $f_z$-$f_q$ which represents a system velocity error.

Attention is invited to the fact that the quantizer pulses applied to servo register 82 and also those applied directly to servo amplifier 70 are taken from stage 76a of error register 76. Negative $f_q$ pulses derived from the left side of memory M17 every time memory M17 is reset and positive $f_q$ pulses derived from memory M22 each time an $f_q$ pulse is applied to memory M17' are applied directly to servo amplifier 70 as hereinafter explained. Negative $f_q$ incrementing pulses are applied to servo register from gate G31 at C2 responsive to receipt from $-f_q$ pulses by memory M17. Positive $f_q$ decrementing pulses are applied to servo register 82 at clock pulse C2 from gate G38 which senses whenever memory M17' is set by a positive $f_q$ pulse.

FIG. 8 also illustrates a portion of the sample logic circuit 77. When sample gating signal $sg_1$ is received, sample gate G8 is enabled at C2 to sense an error bit in memory M20'. If gate G8 is enabled it applies a setting signal to memory M6, FIG. 7.

Figure 9:
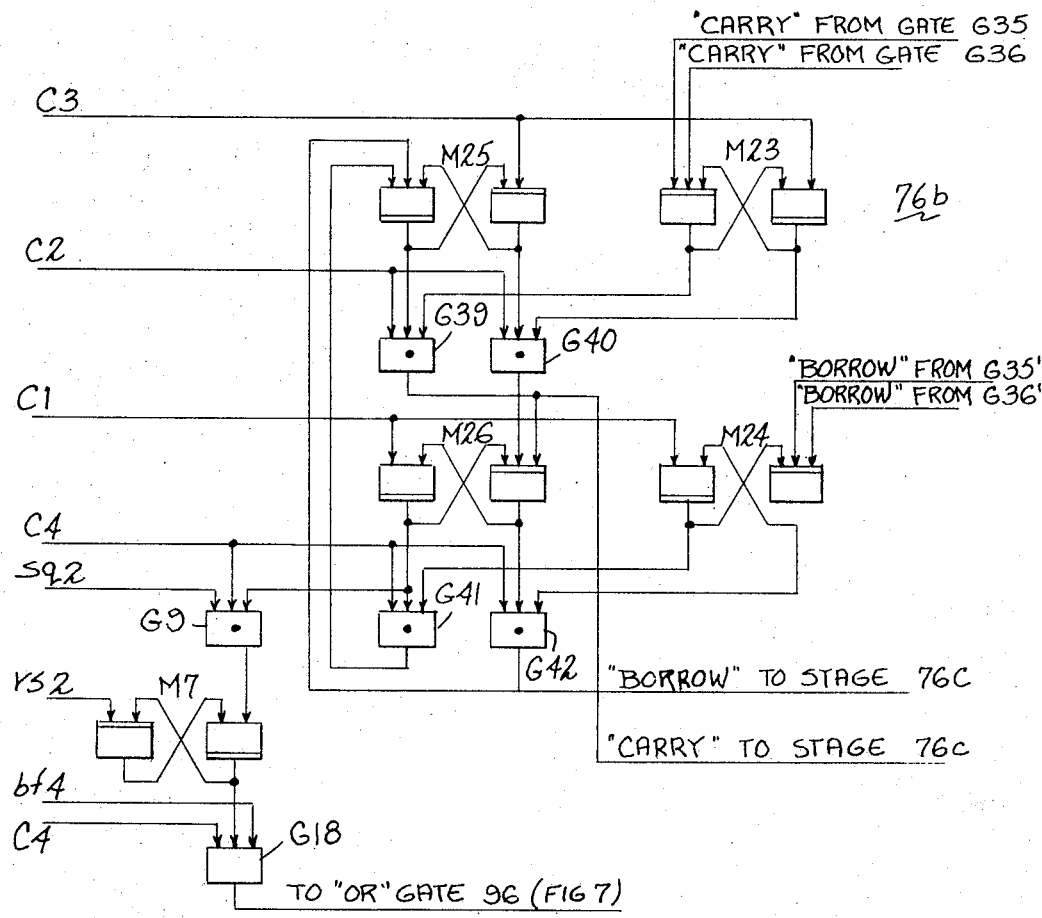
FIG. 9 is a continuation of FIG. 8 showing the second stage of the binary counter.

Reference is now made to FIG. 9 which illustrates the second stage 76b of error register 76. Stage 76b comprises four memories M23, M24, M25 and M26 and gates G39, G40, G41, G42. Memory M23 is the increment memory of stage 76b and receives incrementing pulses from either of gates G35 or G36 of stage 76a. Memory M24 is the decrement memory of stage 76b and receives decrementing or borrow pulses from gate G35' or gate G36' of stage 76a. Memories M25 and M26 ultimately hold the error bit presently in stage 76b for a half clock cycle each. Gates G39 and G40 at clock pulse C2 will add the contents of memory M25 and any carry bit received by memory M23. If memory M25 presently contains an error bit and a carry signal is received by memory M23 gate G38 will forward a carry pulse to stage 76c. Assuming that there is an error bit stored in memory M25 and no carry is received by memory M23 at clock C2 gate G40 will transfer the bit in memory M25 to memory M26. Gates G41 and G42 will then subtract a borrow bit in memory M24, if present, from the error bit in memory M26. If a borrow bit is present in memory M24, gate G41 would then forward a borrow to stage 76c and simultaneously reset memory M25. If no borrow has been received from stage 76a and memory M24 does not receive a decrementing pulse from gate G35' or G36' gate G40 will transfer at clock C4 the error bit, if present, in memory M26 back to memory M25.

At C4 when sample gate signal $sg_2$ is present the contents of memory M26 is sampled to determined if an error bit is present in stage 76b. If upon occurrence of sampling gate signal $sg_2$, gate G9 senses the existence of an error bit in memory M26, gate G9 sets sample memory M7. When sample memory M7 is set it enables gate G18 at clock pulse C4 to pass a $bf_4$ pulse to fine error "OR" gate 96, previously illustrated in FIG. 7.

Figure 10:
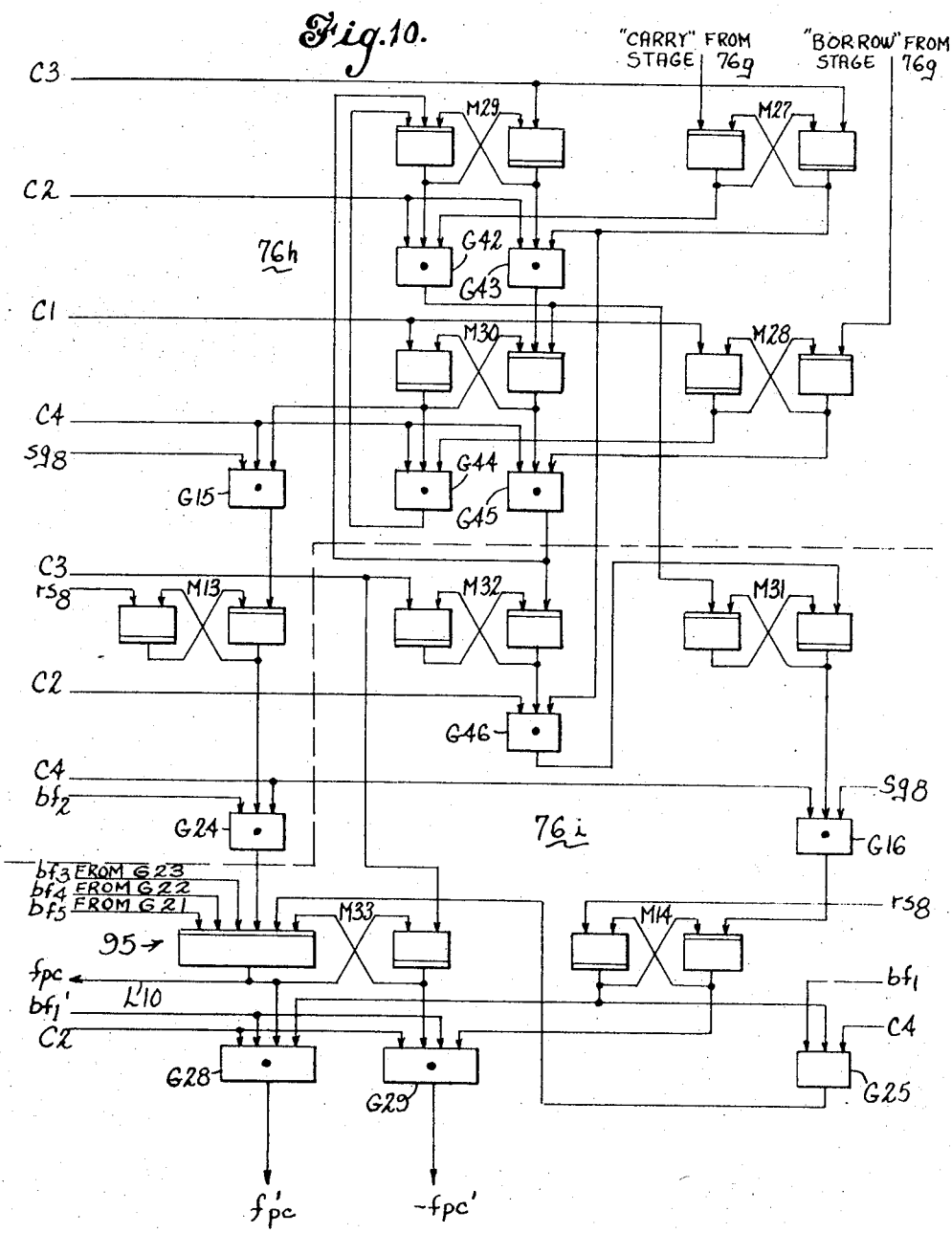
FIG. 10 is a schematic diagram of the most significant numerical stage of the binary counter initially shown in FIG. 7, together with a concluding stage which senses the algebraic sign of the number in the counter.

Stages 76c–76h of error register 76 are the same as disclosed in FIG. 9 as are the sample gating and logic circuits associated therewith. For further clarity of disclosure stage 76h, the most significant bit position of register 76 and sign logic stage 76i will now be described in conjunction with FIG. 10.

Stage 76h comprises an increment memory M27 which receives a carry pulse, if present, from stage 76g, a decrement memory M28 which receives a borrow pulse, if present, from stage 76g, error bit storage memories M29 and M30, a pair of add gates G42 and G43 and a pair of subtract gates G44 and G45.

Associated with stage 76h is sample memory M13 which is reset from sample control register 78 by reset signal $rs_8$ and then set by a following sample gating signal $sg_8$ from gate G15 if gate G15 senses a binary "1" error bit in memory M30. If memory M13 is set by sample gate G15 it will enable gate G24 to pass $bf_2$ pulses to OR gate 95.

Sign logic stage 76i comprises a sign memory M31 which is set by gate G42 to indicate that the error in error register 76 is positive and is reset from gate G45 to indicate that the numerical error in error register 76 is negative. A delay circuit comprising memory M32 and gate G46 is interposed between gate G45 and memory M31 to delay a borrow signal one-half clock cycle so that a borrow to memory M31 does not occur during a sampling function. Memory M31 is normally set. To explain the manner in which memory M31 is reset to indicate a numerical negative error in register 76, assume that a borrow from stage 76g sets memory M28 and the contents of memory M28 must be subtracted from memory M30 which contains a binary "0." In binary subtraction it will be recalled that when "1" is subtracted from "0" the result is a binary "1" with a borrow from the next higher order stage. If memory M30 contains a binary "0" all of the inputs to gate G45 at C4 will be "0," the output of gate G45 will be "1." This sets delay memory M32 and at C2 delay gate G46 will reset memory M31 if memory M27 has not received a carry from stage 76g. Memory M31 will now be in a state indicative of a negative numerical error in error register 76, and will remain in such state until the counter is incremented to zero and set by gate G42. Sample gate G16 will then be enabled by sample gating signal $sg_8$ to set sample sign memory M14 to a state indicative of a negative numerical error in error register 76. The outputs of memory M14 will then inhibit gate G28 and enable gate G29. Therefore, output pulse frequency $f_{pc}$ from OR gate 95 appears on the minus or negative output line. The output of the left side of memory M14 which is a "1" will also inhibit gate G25 and prevent inclusion of pulse frequency $bf_1$ in the output pulse frequency $f_{pc}$.

If memory M31 should be set to indicate a positive error sample gate G16 could not set memory M14 and the "1" output of the right side of memory M14 would inhibit gate G29. Also, the left side of memory M14 would then enable gate G25 and allow the application of pulse frequency $bf_1$ to OR gate 95 which is comprised of a memory M33 having as its inputs pulse frequencies $bf_1$, $bf_2$, $bf_3$, $bf_4$ and $bf_5$, from gates G25, G24, G23, G22, and G21, respectively.

The output of the left side of memory M33 is applied to gate G28. For gate G28 to be enabled it must sense from memory M14 that a positive numerical error exists in error register 76, memory M33 is set, a signal $bf_1'$ is present, and clock pulse C2 occurs. The signal $bf_1'$ is derived from $bf_1$ and occurs in between occurrence of $bf_1$ pulses. As will be apparent this signal $bf_1'$ may be obtained by delaying a $bf_1$ signal for one-half clock cycle it being understood that $bf_1$ occurs every other clock cycle.

The pulse outputs of gates G28 and G29 are applied to incrementing and decrementing inputs of servo register 82 as will hereinafter be described. It is apparent that the presence of the $bf_1$ signal in the output taken directly from memory M33 at line L10 indicates the sign of the error. However, it is not desired to have the $bf_1$ component present in the output of gates G28 and G29. The pulse frequency $bf_1'$ effectively subtracts $bf_1$ from the output of OR gate 95 by opening gates G28 and G29 only every other clock cycle when memory M33 has not been influenced by $bf_1$.

It is readily apparent when the numerical error in register 76 is positive that gate G28 will be enabled each time a $bf_2$, $bf_3$, $bf_4$ or $bf_5$ pulse sets memory M33. This is seen from consideration of Table II where there was a positive error of one hundred seventy-six. In this case one hundred seventy-six pulses are passed by gate G28 in five hundred twelve clock cycles.

However, when the error is negative only $bf_3$ and $bf_5$ pulses (eighty) are applied to memory M33 during five hundred twelve clock cycles. For a true pulse representation of the same numerical error one hundred seventy-six pulses must be passed or produced by gate G29. Gate G29 will produce the required one hundred seventy-six pulses, as now explained.

Memory M33 is reset every clock cycle at C3. Therefore, in the five hundred twelve clock cycles memory M33 could potentially enable gate G29 every clock cycle. But $bf_1'$ inhibits gate G29 every other clock cycle so memory M33 can only enable gate G29 two hundred fifty-six times. However, memory M33 in this time will be set eighty times at C4 upon receipt of $bf_3$ and $bf_5$ pulses. When memory M33 is set at C4 there is only a "0" input to the right side thereof and the output of the right side thereof has a "1" output at the following C2 pulse which inhibits gate G29. Therefore, pulse frequency $-f_{pc}'$ will have a number of pulses (one hundred seventy-six) equal to the negative numerical error in register 76.

Figure 11:
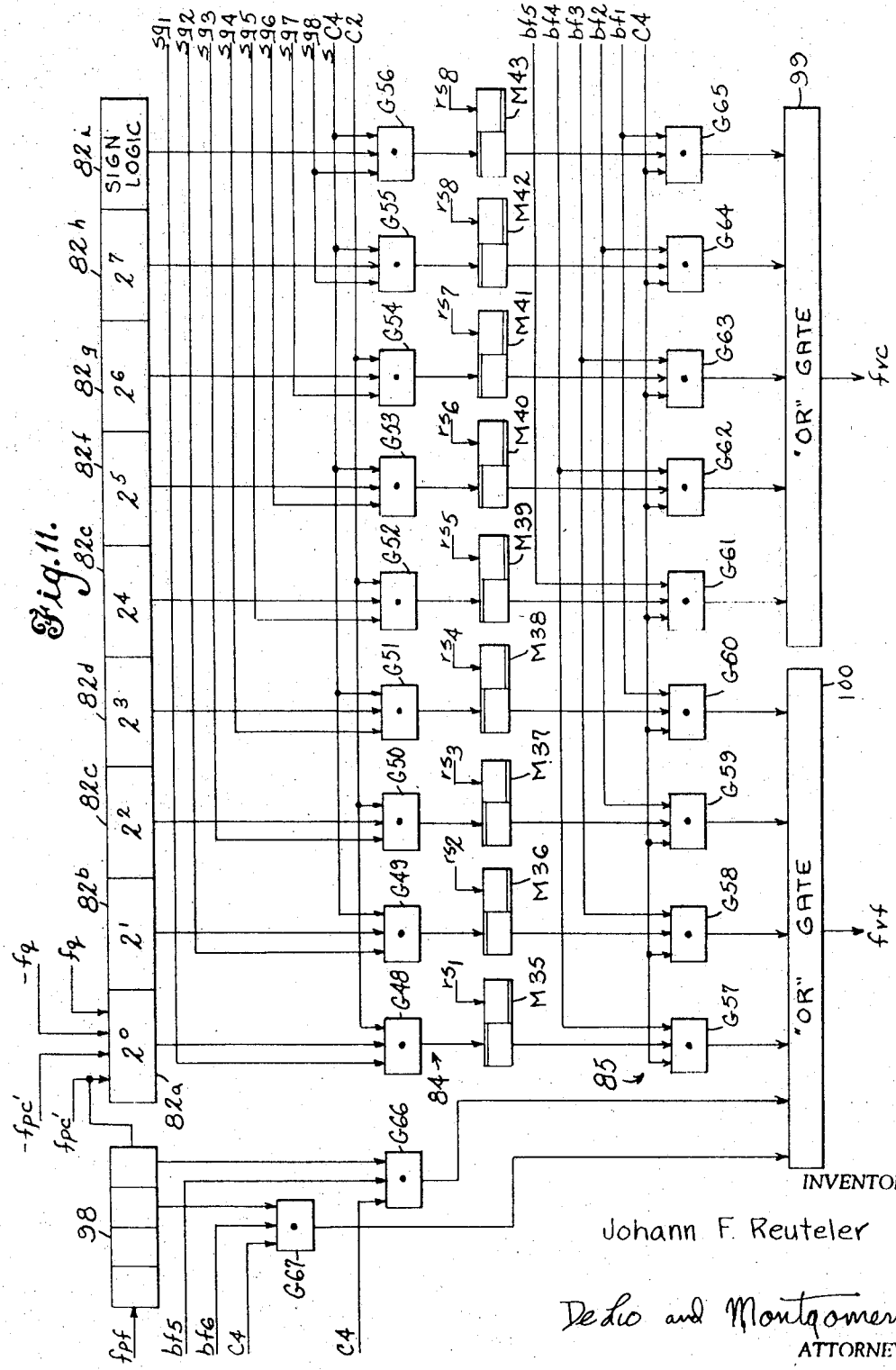
FIG. 11 is a diagram, partly schematic and partly in block form of the servo register of FIG. 2 together with associated sample logic and number-to-frequency converter previously shown in functional block form in FIG. 2.

The pulse outputs $f_{pc}'$ and $-f_{pc}'$ of gates G28 and G29 are applied to the least significant bit stage of servo register 82, FIG. 11, as are positive and negative $f_q$ pulses. The fine error output pulses $f_{pf}$ which have been raised in quantity by a factor of sixteen are applied to a four-stage uni-directional pulse counter 98. Therefore, when counter 98 receives sixteen fine error pulses $f_{pf}$ it will apply one incrementing pulse to input stage 82a of servo register 82. This input pulse from counter 98 has the same effect as a positive coarse error pulse $f_{pc}$. Servo register 82 is constructed in the same manner as error register 76 and comprises eight numerical stages, 82a–82h plus a sign logic stage 82i.

The structure of servo register 82, sample logic 84 and number-to-frequency converter 85 as shown in FIG. 11 is seen to be substantially identical to servo register 76, sample logic 77 and number-to-frequency converter 79 shown in FIG. 7. In sample logic 84 gates G48–G56 are provided to sample the contents of servo register stages 82a–82i, respectively, every thirty-two clock cycles. When any of the gates G48–G56 sense that an associated stage of error register 82 contains a binary "1" digit it sets an associated memory M35–M43. If the memories M35–M43 are set they enable gates G57–G65, respectively, to pass selected ones of $bf_1$–$bf_5$ pulses.

Pulse frequencies $bf_1$–$bf_5$ passed by gates G61–G65 are summed in an OR gate 99. The presence of pulse frequency $bf_1$ in this summation determines the algebraic sign of the numerical content of register 83 in the same manner as explained in conjunction with error register 76. The output of OR gate 99 is termed the coarse error servo register pulses $f_{vc}$. OR gate 100 sums the output pulses of gates G57, G58, G59, G60, G66 and G67, the last two mentioned gates being enabled by the presence of a binary "1" digit in the last two stages of unidirectional counter 98. It will be noted that the application of pulse frequencies $bf_1$–$bf_4$ to gates G60, G59, G58, G57, respectively, effectively increases the weight of the fine error pulses $f_{vf}$ from OR gate 100 by a factor of $2^5$. The weight of the pulse frequency $f_{vc}$ will subsequently be diminished by a like factor.

The manner in which the $f_{vc}$ pulses are diminished in weight is shown in copending U.S. patent application Ser. No. 349,216, now U.S. Pat. 3,443,178, of which this application is a continuation.

Briefly stated, as disclosed in said copending patent application Ser. No. 349,216, the generated pulse trains are applied to a servo amplifier which controls the drive for the controlled part.

ABSOLUTE SYSTEM—GENERAL ARRANGEMENT

The invention may also be embodied in a system of the type referred to as an absolute system. Such a system is disclosed in copending application, Ser. No. 631,214, filed Apr. 17, 1967 of Johann F. Reuteler and assigned to the same assignee as the present invention. The disclosure of this application is incorporated herein by reference. Such a system is generally illustrated for one axis in FIG. 12 and comprises an information input and translator network 101, a position command register 102, which receives in numerical form the coordinate along one axis to which a controlled part 103 is to be moved. A feed frequency generator 104 provides a feedrate frequency utilizing the feedrate number on the tape and a feedrate override control. An interpolator 105 receives information from the position command register, feed frequency generator 104 and an instantaneous command register 106. The interpolator receives information regarding the commanded end point, the instantaneous commanded position of the controlled part as determined by the number of command pulses generated by the interpolator 105 and also feedrate instructions from feed frequency generator 104. The interpolator 105 is used when the machine is contouring. If the system of FIG. 12 should be operating along only one axis it would receive command pulses from pulse distributor 107. The instantaneous command register 106 accumulates the instantaneous commanded position which is indicated by the number of command pulses from interpolator 105. A position register 108 accumulates the number of feedback or quantizer pulses from a quantizer 109 which is indicative of the actual position that the controlled part 103 has reached. The position register 108 is of the absolute type in that it always indicates the actual position of the object from a reference point. The instantaneous command register is of the absolute sense in that it always indicates the instantaneous commanded position of the controlled part with respect to a reference point. The numerical contents of instantaneous command register 106 and position register 108 are applied to a subtractor 110.

At this point it will be appreciated that the instantaneous command register 106, position register 108 and subtractor 110 are the equivalent of the bidirectional counter of the position error register, and the difference is merely one of form and components. It will be apparent that the position error or lag derived from subtractor 110 could be shifted into static storage and converted to a pulse frequency proportional to the lag, as shown in FIG. 7 and heretofore explained. However, in this embodiment of the invention, recirculating techniques may be more efficiently utilized.

The subtractor 110 subtracts the actual numerical position as expressed in position register 102 from the instantaneous commanded position in register 106 to provide the position error or lag of the actual position of the controlled part from its instantaneous commanded position. A sign predictor network 111 samples the sign of the numerical position in registers 106 and 108 and signifies the resultant sign of the subtraction in subtractor 110 to a decomplementor 112. The resultant lag or position error which may or may not be decomplemented is applied to a number-to-frequency converter 113 which generates a pulse frequency proportional to the lag or position error as determined by subtractor 110. As will hereinafter be described, the conversion factor may be made variable as a function of the lag to control the deceleration of the controlled part 103.

The pulse frequency from the lag-to-frequency converter is applied to a servo amplifier 114 in a manner previously disclosed which then generates signals to control the drive 115.

In this embodiment of the invention, recirculating digital technology may be used. The position register 108 may comprise a recirculating register which, for purposes of example, will be considered to have twenty-four stages. The instantaneous command register will be considered to be a twenty-four stage recirculating register having a bidirectional summing stage. The cycle of operation will be considered to be twenty-four clock cycles utilizing the same clock waveforms. Additionally, during each of these twenty-four clock cycles there will be generated marker signals N0–N23 and N0'–N23', FIG. 14. The prime markers N' change value only during the first half of the clock cycle during C1 and C2, and are used only during the second half of a clock cycle. The unprimed markers change during the C3 and C4 portions of a clock cycle and are used only during the first half of each clock cycle. The marker signals N are generated by a shift register which is shifted each clock cycle in a manner well known to those skilled in the art.

The instantaneous command register 106, position register 108, subtractor 110, and decomplementor 112 and sign predictor 111 are shown in more detail in FIG. 13. Both the instantaneous command register 106 and position register 108 have provision for adding bits therein. Instantaneous command register 106 includes a bi-directional adder stage 117 where once each twenty-four clock cycles or one marker cycle a command pulse may be added in the least significant bit. When the least significant bit of the position number in the instantaneous command register is in stage 117 the most significant bit is in the adjacent stage, which most significant bit indicates the sign of the number therein. Correspondingly, the sign of the numerical position in the position register 108 is in the second stage thereof and such signs are applied to sign predictor 111.

The position register 108 is a twenty-four stage recirculating register having one stage 118 adapted to receive an overflow from a parallel adder 119 which receives the position feedback pulses from quantizer 109.

Each marker or recirculation cycle, which is twenty-four clock cycles, the contents of the position register 108 are subtracted from the contents of the instantaneous command register 106 in subtractor 110. A serial subtraction, least significant bit first, occurs bit by bit and the result of such subtraction is applied to decomplementor 112 which may or may not decomplement the result of such subtraction dependent upon a signal from sign predictor 111.

The numbers IC, $\overline{IC}$, PR, $\overline{PR}$ are derived from the ICR and position register and are applied to four logic gates G70–G73 to determine the larger of IC and PS.

Each of the four gates also receives a gating pulse C4. Two of the gates receive N0' which keeps these gates closed during marker time N0. Two of the gates receive $\overline{N0}'$ which opens these gates as the sign bit of the ICR and position register is read.

The four gates are utilized to set or reset a memory M50 in accordance with the larger of the two numbers and the sign of the resultant subtraction. When the memory is set or reset and at marker $\overline{N1}$ the state of the memory is read at the end of a recirculation cycle through gates G75 and G76 into a sign memory M51. Sign memory M51 is then set or reset for one recirculation cycle to indicate the sign of the number coming out of the subtractor. The sign memory together with clock pulse C4 controls decomplementor gates G77 and G78 which receive the lag number from subtractor 110. If one of these decomplementor gates is opened the number will be copied directly into a memory M62 which is reset every clock pulse C3. If the sign of IC-PR which is the lag number L is negative as indicated by the sign memory, the decomplementing gate will be open to pass L and thereby decomplement a negative number.

The resultant output from memory M52 is the absolute lag number L for one axis. For purposes of explanation, the axis under discussion will be considered to be the X-axis.

VELOCITY CONTROL

It is highly desirable to control the deceleration of the parts as a function of the position lag. This reduces the mechanical stresses and strains on the machine parts in stopping movement of heavy machines, and also allows the deceleration to take place at maximum permissible rate with no undue loss in time. Moreover, this allows achievement of maximum servo performance at low speeds and at zero speeds.

During steady state operation, the lag is constant. However, as the machine parts approach the commanded end point and decelerate, the lag decreases and, accordingly, the velocity of the parts must decrease with the lag. To accurately stop all movement of all parts at a desired end point defined in two or more coordinate axes the ratio $V/L$, where V is the velocity of the part and L is the lag for each axis, should be equal for all axes at any instant.

To achieve this, two velocity signals are generated which will be termed $V_j$ and $V_h$, as will hereinafter be made apparent. $V_j$ is proportional to the lag of one axis and the $V_h$ is a function of the lag of all axes. For exemplary purposes, reference is made to the servo block diagram of FIG. 15.

The lag number L is representative of the numerical position lag of one axis, the X-axis and is applied to a number-to-frequency converter 120 with a frequency $K_h$ where it is converted to a pulse frequency $V_h$ which represents a velocity. The frequency $V_{hx}$ is summed with frequencies $V_{hy}$ and $V_{hz}$ at H to provide a function which is a composite of all the lag frequencies. The function H modifies the frequency $K_h$ applied to converter 120 at summer 121.

The lag number L is further applied to a number-to-frequency converter 122 where it is converted to a frequency $V_j$ from a frequency $K_{jx}$. The frequencies $V_{hx}$ and $V_{jx}$ are then summed at 123 to provide a resultant velocity signal in the form of frequency $V_r$.

The action of the system of FIG. 16 may be expressed mathematically as follows:

$$V_j = LK_j \qquad (1)$$

and $$V_h = L(K_h - V_h H) = \frac{LK_h}{1+HL} \qquad (2)$$

$$V_r = V_h + V_j = LK_j + \frac{LK_h}{1+HL} \qquad (3)$$

and $$V_r = V_h + V_j = L\left[K_j + \frac{K_h}{(1+H\Sigma L)}\right] \qquad (4)$$

since HL is a function of the lag of all axes.

The arrangement for deriving $K_h$ and the resultant velocity frequency $K_{hx}$ is shown in schematic logical form in FIG. 16.

The clock frequency is applied through a gate 124, which is opened by a $K_h$ pulse, to a counter 125 which is exemplified as having seven counting stages and a summer 125a following the $2^2$ stage. The $2^3$, $2^4$, $2^5$, and $2^6$ stages are sampled by gates 126–129, respectively, which pass the binary related frequencies $bf_1$, $bf_2$, $bf_3$, and frequency $bf_{03}$. It will be recalled that the $bf_1$, $bf_2$ and $bf_3$ frequencies have a non-coincident binary relationship. The $bf_{03}$ frequency is the carry pulse generated in generator 55 between $bf_3$'s.

The output frequencies of gates 126–129 are summed in OR gate 130, and applied to coincidence gate 131. This produces the pulse frequency $K_h$. So long as a binary "1" exists in the $2^6$ stage of counter 125 of a $bf$ pulse is passed by OR gate 130, AND gate 124 is closed. When counter 125 is full the pulse frequency $K_h$ is equal to the clock frequency. When this occurs counter 125 will be decremented as hereinafter described.

Counter 125 is incremented by the clock frequency at each clock cycle when a $K_h$ pulse is not present and is decremented as a function of the lag frequency of each axis as hereinafter explained.

The frequency $K_h$ is applied to the counter 133 of a binary frequency generator 134. Gates 135–139 are enabled by the five most significant bits of the X-axis lag number $L_x$ to enable passage of the non-carry pulses of counter 133. The pulse frequency output of OR gate 140a is the velocity pulse frequency $V_h$ for the X-axis.

The velocity pulse frequencies $V_h$ for the Y and Z axes are applied to a summer 140 together with the X-axis $V_h$. The summer is constructed like the hold circuit of FIG. 8, and arranged so that every other pulse input produces a carry output. This output decrements the $2^3$ stage of counter 125, and makes the number in counter 125, at any time, a function of the lag of all axes. Thus the frequency $K_h$ is a function of the lag of all axes. This corresponds to the factor $H\Sigma L$ in Equation 4 supra.

The binary related non-carry pulse frequencies $cf_1$–$cf_5$ from the stages of counter 133 are applied to the number-to-frequency converters for the other axes (not shown).

Accordingly, the binary frequency generator 134 runs at a rate proportional to the $\Sigma L$ which is a function of the lags of all axes.

The output L of subtractor 110 as it may be decomplemented is applied to gate G80 and, hence, to a memory M65, FIG. 17. Memory M65 is set in accordance with the bits of L. At markers $\overline{N2}'$–$\overline{N11}'$, the ten LSB of L are passed by a gate G81. The number passing gate G81 is applied through gates G82 and G83 to the augend stage 143 of a twelve stage shift register 144 which recirculates twice every marker cycle. The number in register 144 recirculates with the markers. The number in register 144 is continually incremented and the overflow from augend stage produces the pulse frequency $K_{j1}$ for the X-axis.

The continual addition of L (ten LSB) to itself produces overflow pulses at a rate proportional to the magnitude of the number. This is a component of the pulse frequency $V_j$ and may be termed $V_{j1}$.

The $2^{10}$ and $2^{11}$ bits of L are sensed by gate G95 at N12' and N13' and are added with the $2^{12}$ bit at N21' from gate G96 in OR gate G97. The $V_{j2}$ pulses due to these bits provide the upper weight of frequency $V_j$.

The number L is also applied to shift register 142 which is a fifteen stage register in two seven and one-half stage sections 142a and 142b. Bits of the number L may pass the second section 142b only when a KJG gating signal is present. This occurs only during the second recirculation of register 144 during a marker cycle. Also, the seven LSB are raised by a factor of $2^3$ by this delay.

Referring briefly to FIG. 18, the overflow pulse of counter 133 sets memory M66. At the following marker M9, gate G84 reads the state of M66 into M67. Memory M67 is reset at N13. Thus from N9 through N12 memory M67 states that counter 133 has overflowed or, otherwise stated, thirty-two $K_h$ pulses have occurred. When memory M67 is reset, it resets memory M66 through gate G85.

When memory M67 is set it sets memory M68, through gate G85, which remains set from N10 through N16, and is reset at N16'. Memory M68 controls gate KJG. Memory M67 when set also provides a shift signal through inversion gate G86.

When gate KJG is enabled at N10–N16 it allows only the seven LSB of L to be shifted out of register portion 142b. This occurs at N17–N23. These seven LSB enter register 144 in its second recirculation of a marker cycle. The seven LSB are advanced by a factor of $2^3$ with respect to the bits of L passed by gate G81. However, gate KJG may be opened at a maximum rate of every thirty-two clock cycles, when $K_h$ is equal to the clock frequency.

Thus two portions of L are added to register 144 each marker cycle. The addition of the seven LSB raised by $2^3$ in register 144 contributes the component $V_{h1}$ to the output of gate G87. This component frequency $V_{h1}$ varies as a function of all of the lags. The frequency $V_{j1}$ is due to the ten LSB of L passed by gate G81 which is proportional to the magnitude of the lag for that axis. As hereinafter made apparent if L is less than $2^7$, $$V_{j1}+V_{h1}$$

is the controlling velocity frequency.

The $2^7$–$2^{11}$ bits of L are sensed by gate G88 and G89 and forwarded by memory M69 to shift register 147 (FIG. 19) at N9–N13 through gate G90 when a shift control signal is passed by gate G86. Then when a $cf_5$ pulse occurs every thirty-two $K_h$ pulses, the number in register 147 is passed to static storage register 148. Gates G89–G93 then pass the non-coincident pulses of binary frequencies $cf_1$–$cf_5$ which are summed by OR gate G94 to provide the velocity pulse frequency $V_{h2}$. The frequency $V_{h2}$ is a function of the lag of all axes, as previously described in conjunction with FIG. 16.

The lag velocity summer 140 of FIG. 16 also receives a frequency $\Sigma V_{h1}$. This is derived as shown in FIG. 20.

The seven LSB of L are derived from gate G95 or gate G96 for each axis. The number for the X and Y axes are applied to one-half shift stages 150 and 151 from N10–N16 and then added in one stage adder 152 and applied to an eight bit recirculating shift register 153.

During time N18–N0 the seven LSB of L of the Z-axis and the B-axis (rotary table if used) are applied to adder 152 and, hence, to register 153. The overflow resulting from the addition of these numbers provides a pulse frequency $\Sigma V_{h1}$ which is utilized to decrement counter 125 in accordance with the frequency components $V_{h1}$ for all axes. The overflow or carry is out of the eighth bit in register 153, which acts to divide the resulting pulse frequency by a factor of two.

The pulse of frequencies $V_h$ and $V_j$ for each axis are summed as indicated at 123 in FIG. 15 to provide the resultant pulse frequency $V_r$. The pulse frequency $V_r$ is then applied to the servo amplifier to move the controlled object or slide.

From the foregoing it is apparent that the resultant pulse frequency $V_r$ for each axis is a function of both the lag in its own axis and a function of the lag of all axes as represented by $H\Sigma L$.

This arrangement provides maximum servo performance at low speeds and lets the slide approach its commanded end point with the highest possible servo performance. Moreover, it provides a constant $V/L$ ratio for all axes to insure extremely accurate positioning of all slides at their commanded end points.

From the foregoing it may be seen that the factor by which the position lag as determined by subtractor 110 is converted to a frequency by the lag-to-frequency converter is variable. At small lag values a unit change of lag produces a greater change of the lag frequency than is produced by a unit change of lag at high lag values. This maintains a desirable "tight" or high response servo at small lag values, yet prevents excessive deceleration rates which would otherwise result when slowing down from high slide velocities. The disclosed arrangement makes the lag to frequency converter factor, at any instant, the same for all axes and is dependent on the sum of the lag of all axes.

It will be apparent that the velocity control system as disclosed for the system of FIG. 12 may be included in the system of FIG. 1. The variable number-to-frequency conversion feature may be included in any plural axes digital servo system in which the position error or lag is connected to a pulse frequency and utilized to move the controlled objects.

The resulting frequencies $V_r$ for each axis may be applied to any suitable pulse responsive drive system to move controlled objects at the predetermined rate and distance. For example, the pulse frequency $V_r$ could be applied to servo register 82 (FIG. 2) over line 80.

It may thus be seen that the objects of the invention set forth above as well as those made apparent from the preceding description are efficiently attained. While preferred embodiments of the invention have been set forth for purposes of disclosure, other embodiments of the invention as well as modifications to the disclosed embodiments may occur to those skilled in the art. Accordingly, the appended claims are intended to cover all embodiments of the invention which do not depart from the spirt and scope thereof.

What is claimed is:

1. A pulse responsive servo system for moving an object at a predetermined rate a predetermined distance, comprising means providing a train of command pulses where each pulse is indicative of an incremental distance of desired travel of the object, means for deriving a train of feedback pulses where each pulse is indicative of an incremental distance of actual travel of the object, means for comparing the number of pulses of said pulse trains means providing a numerical representation in binary form of the difference therebetween, means providing a pulrality of pulse frequencies having a binary frequency relationship, a plurality of gates, each of said gates being associated with a binary weight of said numerical representation means and enabled or inhibited by the presence or absence of a bit in the associated position of said numerical representation means, means for applying each of said pulse frequencies to one of said gates whereby the enabled gates will pass the pulses applied thereto, and means for utilizing the pulses passed by said gates to move the object.

2. The system of claim 1 wherein said means for comparing comprises a bidirectional binary pulse counter, sign means arranged with the counter for sensing the algebraic sign of the number held therein, said sign means being effective to pass or inhibit the highest order of said pulse frequencies, the presence or absence of the highest order pulse frequency in said pulses passed by said gating means being indicative of the algebraic sign of the number in the counter.

3. In a system for moving an object a distance proportional to a number of command pulses at a velocity proportional to the repetition rate of the command pulses, means providing a first train of command pulses, means for deriving a second train of feedback pulses each indicative of an incremental distance of actual travel of the object, means for comparing a number of pulses of said pulse trains to determine the position error of the object, means responsive to said comparing means providing numerical representation in binary form of the position error, means providing a plurality of pulse trains having binarily related frequencies and non-coincident pulses, a plurality of gates each arranged to pass one of said plurality of pulse trains, each of said gates being enabled or inhibited by the presence or absence of a bit in a corresponding binary weight of said numerical representation means, means for applying said plurality of pulse trains to said plurality of gates, and means for utilizing the pulses of said pulse train occurring to move an object.

4. The system of claim 3 further including means for indicating the sign of said numerical representation of the difference and in response thereto enabling or inhibiting the highest order binary frequency, the presence or absence of the highest order pulse frequency in the third pulse train being indicative of the algebraic sign of the numerical representation of the difference.

5. The system of claim 3 wherein said means for comparing is a bi-directional pulse counter having a multiplicity of cascaded numerical stages and a sign stage connected to the most significant numerical stage and arranged to sense the algebraic sign of a number in the counter.

6. The system of claim 3 wherein said pulse frequencies comprise a plurality of pulse trains having binarily related frequencies and non-coincident pulses.

7. In combination, means for determining the difference between two numbers and storing a resultant number in numerical binary form, a multiplicity of gates, each gate being associated with a stage of said storage means and arranged to be enabled by the presence of a binary digit in said corresponding stage, means for deriving a multiplicity of pulse trains having binarily related frequencies and applying one of said pulse trains to each of said gates, and means for summing the pulse frequencies passed by said gates to provide a resultant pulse train having a pulse repetition rate proportional to the number in said means for storing.

8. The system of claim 7 wherein said storage means comprises a bidirectional binary pulse counter arranged to determine the algebraic sign of the number in said counter, the algebraic sign of the number in said counter determining the highest frequency pulse train applied to the gate corresponding to the highest order binary frequency, the presence or absence of the highest order pulse frequency in the resultant pulse train passing said gates determining the sign of the number in said counter, and means for summing the pulse frequencies passing said gates to provide a resultant pulse train having a pulse repetition rate proportional to the number in said counter and indicative of the algebraic sign of the number.

9. The system of claim 8 further comprising a multiplicity of bistable devices, each of said bistable devices being arranged to be set in a state indicative of a binary digit and a corresponding counter stage, means for sensing the presence of a binary digit in each counter stage and setting a corresponding bistable device to its indicative state in response thereto, means for resetting each bistable device to its other state, means for periodically actuating said resetting means and said sensing means in such sequence as to set said bistable devices in accordance with the number in said counter stages, said resetting and sensing means sequentially operating at a rate equal to the rate of propagation of a carry through the stages of said counter, each of said bistable devices when set enabling a corresponding one of said multiplicity of gates.

10. In combination, a bidirectional binary pulse counter having a multiplicity of cascaded numerical stages, means for applying incrementing and decrementing pulses to said counter, a multiplicity of gates, each gate arranged to sense the presence of a bit in a stage of said counter, a multiplicity of bistable devices, each of said gates when enabled being effective to set a corresponding one of said bistable devices to a state indicative of the content of a corresponding counter stage, a second multiplicity of gates each arranged to be enabled by a corresponding one of said bistable devices when the bistable device is set to a state indicative of a bit in a corresponding counter stage, means for deriving a multiplicity of pulse trains having binary related frequencies and applying a pulse train to each of said second multiplicity of gates, and means for summing the pulse frequencies passing said second multiplicity of gates to provide a resultant pulse train having a pulse repetition rate proportional to the number in the stages of said counter and indicative of the algebraic sign of the number.

11. The combination of claim 10 further comprising means providing a plurality of sequentially occurring gating signals and a plurality of sequentially occurring resetting signals, the gating signals and the resetting signals both sequentially occurring at rates equal to the rate of propagation of a carry signal through the stages of the counter, means for applying each resetting signal to one of said bistable devices in increasing binary order, means for applying each gating signal to one of said first multiplicity of gates in increasing binary order, the time of application of the gating and resetting signals being such that the first occurring resetting signal resets the bistable device corresponding to the least significant counter stage, and essentially simultaneously, the second occurring resetting signal resets the bistable device corresponding to the next least significant counter stage and the first occurring gating signal enables the gate of said first multiplicity corresponding to the least significant counter stage.

12. The combination of claim 10 wherein said pulse providing means is actuated at predetermined intervals of time to periodically sample the numerical contents of the counter.

13. The combination of claim 10 further comprising means for periodically resetting said bistable devices and then setting said bistable devices in accordance with the numerical content of said counter when the numerical content of the counter is not changing.

14. A system for moving two or more objects with respect to reference axes to define a resultant path, comprising means commanding a position of each object, means signifying the actual position of each object, means for driving a representation of the position lag of each object, means providing a first pulse train, means for utilizing each of said representations and said pulse train to derive two or more pulse trains for moving each object, means for varying the frequency of said first pulse train as a function of the lag of each axis, and means for utilizing said two or more pulse trains for moving the objects.

15. The system of claim 14 wherein said first train is converted into a plurality of pulse trains having binarily related frequencies, means associated with each object and utilizing said binarily related frequencies for converting the position lag representation into said two or more pulse frequencies each having a number of pulses in predetermined units of time corresponding to said position lag representations, means for summing the pulses of said two or more pulse frequencies, and means for applying said summed pulses to said means for varying.

16. The system of claim 14 wherein said means providing a first pulse train comprises a binary counter, means generating said first pulse train as a function of the numerical content of said counter, means for incrementing said counter with a reference pulse frequency, and means for decrementing said counter as a function of the position lag of said two or more objects.

17. The system of claim 16 including gating means for preventing application of a pulse of said reference frequency to said counter when a pulse of said first pulse train is generated.

18. The system of claim 16 further comprising a second binary counter, means for incrementing said second counter with the pulses of said first frequency, means for deriving a plurality of binarily related frequencies from said second counter, and means for utilizing said binarily related frequencies in conjunction with each of said position lag representations to derive said two or more pulse trains.

19. A system for moving two or more objects along reference axes to define a resultant path, comprising means providing a first train of command pulses for each of said objects, means for deriving a second train of feedback pulses for each of said objects indicative of the distance of actual travel of the object, means for comparing each train of command and feedback pulses and deriving numerical representations of the position lags therebetween, means providing a third pulse frequency, means for converting said representations to other pulse frequencies of each axis utilizing said third pulse frequency, means for varying said third pulse frequency as a function of the position lag of all objects, and means for utilizing said other pulse frequencies to move the objects.

20. A system for moving two or more objects with respect to reference axes to define a resultant path, comprising means commanding a position of each object, means signifying the actual position of each object, means for driving a binary representation of the position lag of each object, a binary register having a predetermined number of stages for each axis, means for repetitively adding each binary representation to its associated register, means for detecting overflow pulses from each register and using the overflow pulses from each register to move the associated object, and means for controlling the rate of addition of each binary representation in its associated register as a function of all of said binary representations.

21. The system of claim 20 further including a lag summing register, means for adding all of said binary representations in said lag summing register, means for detecting overflow pulses from said lag summing register, said means for controlling the rate of overflow of said lag summing register being responsive to the overflow pulses of said lag summing register.

22. The system of claim 20 further including a binary counter, means providing a pulse frequency incrementing said counter, a predetermined carrying pulse from said counter being effective to enable an addition of each binary representation in its associated register, summing means for repetitively summing all of said binary representations and providing overflow pulses at a rate indicative of the magnitude of said binary representations, and means for modifying the rate of said incrementing pulse frequency as a function of said overflow pulses.

23. A system for moving two or more objects with respect to reference axes to define a resultant path comprising, means commanding a position of each object, means signifying the actual position of each object, means responsive to said commanding means and said signifying means for deriving a representation of the position lag of each object, means providing a first signal, means for utilizing each of said representations and said first signal to derive two or more additional signals for moving each object, means for varying said first signal as a function of the position lag of each axis and means for utilizing said two or more additional signals for moving the objects.

References Cited

UNITED STATES PATENTS

| | | | |
|---|---|---|---|
| 3,098,187 | 7/1963 | Sciaky | 318—162 |
| 3,202,895 | 8/1965 | Arp et al. | 318—28X |
| 3,209,222 | 9/1965 | Holy | 318—18X |
| 3,349,229 | 10/1967 | Evans | 318—18 |

BENJAMIN DOBECK, Primary Examiner

U.S. Cl. X.R.

318—571